(12) United States Patent
Gao et al.

(10) Patent No.: US 11,805,953 B2
(45) Date of Patent: Nov. 7, 2023

(54) FLOOR MOPPING MACHINE

(71) Applicant: Xiang Gao, Heilongjiang (CN)

(72) Inventors: Xiang Gao, Heilongjiang (CN); Qijia Gao, Heilongjiang (CN)

(73) Assignee: Sanya Chuangneng Technology Co., Ltd., Sanya (CN)

( * ) Notice: Subject to any disclaimer, the term of this patent is extended or adjusted under 35 U.S.C. 154(b) by 323 days.

(21) Appl. No.: 17/206,627

(22) Filed: Mar. 19, 2021

(65) Prior Publication Data
US 2021/0204784 A1   Jul. 8, 2021

Related U.S. Application Data

(63) Continuation of application No. PCT/CN2019/107156, filed on Sep. 22, 2019.

(30) Foreign Application Priority Data

Oct. 24, 2018 (CN) .......................... 201811246327.1

(51) Int. Cl.
A47L 11/283 (2006.01)
A47L 9/00 (2006.01)
A47L 9/14 (2006.01)
A47L 9/28 (2006.01)
A47L 11/40 (2006.01)

(52) U.S. Cl.
CPC ............. A47L 11/283 (2013.01); A47L 9/009 (2013.01); A47L 9/1409 (2013.01); A47L 9/2873 (2013.01); A47L 9/2894 (2013.01); A47L 11/4005 (2013.01); A47L 11/4027 (2013.01); A47L 11/4038 (2013.01); A47L 11/4061 (2013.01); A47L 11/4066 (2013.01); A47L 11/4083 (2013.01); A47L 11/4088 (2013.01);

(Continued)

(58) Field of Classification Search
CPC ........ A47L 11/00; A47L 11/28; A47L 11/283; A47L 11/29; A47L 11/292; A47L 11/293; A47L 11/294; A47L 11/30; A47L 11/32; A47L 11/305; A47L 11/4013; A47L 11/4038; A47L 11/4083; A47L 11/4088
See application file for complete search history.

(56) References Cited

U.S. PATENT DOCUMENTS

2015/0082579 A1   3/2015   Lin

FOREIGN PATENT DOCUMENTS

CN   202699049 U   1/2013
CN   203226772 U   10/2013
(Continued)

OTHER PUBLICATIONS

English translation of JP2010526596A (Year: 2010).*
English translation of CN107920709A (Year: 2018).*

Primary Examiner — Brian D Keller
Assistant Examiner — Sukwoo James Chang

(57) ABSTRACT

A floor mopping machine includes a casing and a motor. A partition plate is arranged at a middle of the casing, and a battery is arranged at a side of the partition plate. A first support roller is provided at an end of the battery away from the motor, and a second support roller is provided at an end of the first support roller away from the battery. A set of second pressure rollers are arranged between the first support roller and the second support roller, and a set of third pressure rollers are arranged between the first support roller and a driving roller.

6 Claims, 24 Drawing Sheets

(52) U.S. Cl.
CPC ..... *A47L 11/4091* (2013.01); *A47L 2201/022* (2013.01); *A47L 2201/04* (2013.01)

(56) References Cited

FOREIGN PATENT DOCUMENTS

| | | | | |
|---|---|---|---|---|
| CN | 203789839 U | | 8/2014 | |
| CN | 204654824 U | | 9/2015 | |
| CN | 206261559 U | | 6/2017 | |
| CN | 206964594 U | | 2/2018 | |
| CN | 107920709 A | * | 4/2018 | ........... A47L 9/2852 |
| CN | 108078504 A | | 5/2018 | |
| CN | 109106296 A | | 1/2019 | |
| JP | 0518455 A | | 1/1993 | |
| JP | 2010526596 A | * | 8/2010 | ........... A47L 9/0477 |
| JP | 2013078656 A | | 5/2013 | |

* cited by examiner

Infrared transceiver
module (YS-IRTM)

Eighth motor (38STG-100)

Tenth motor (38STG-100)

Ninth motor (38STG-100)

Eleventh motor (38STG-100)

Second motor(DS36RP555)

First joint motor(DS36RP555)

Second joint motor(DS36RP555)

Third joint motor(DS36RP555)

Fourth joint motor(DS36RP555)

Fifth joint motor(DS36RP555)

First motor(DS36RP555)

Sixth joint motor(DS36RP555)

Fourth motor(35BYJ412)

Backup motor(35BYJ412)

Auxiliary motor
(ZWBPD024024-36)

Motor of auxiliary machine C1
(DS36RP555)

Third motor (38STG-100)

Seventh joint motor
(DS36RP555)

FLOOR MOPPING MACHINE

CROSS-REFERENCE TO RELATED APPLICATIONS

This application is a continuation of International Patent Application No. PCT/CN2019/107156 with a filing date of Sep. 22, 2019, which claims the benefit of priority from Chinese Patent Application No. 201811246327.1 with a filing date of Oct. 24, 2018. The content of the aforementioned applications, including any intervening amendments thereto, is incorporated herein by reference.

TECHNICAL FIELD

The present application relates to cleaning machines, and more particularly to a floor mopping machine.

BACKGROUND

At present, the commercially-available mechanized floor scrubbers used in public places are divided into large, medium and small floor scrubbers in terms of the scrubbing area. Generally, the floor scrubbers with a scrubbing area of more than 2000 square meters are manually driven during operation, and those with a scrubbing area of less than 2000 square meters are manually held during operation. Due to the complex scenes and frequent personnel activities in public areas, the medium and small floor scrubbers are difficult to be applied in places with a floor area of less than 500 square meters. Currently, small hand-held floor scrubbers are available in the market. However, such small hand-held floor scrubbers have no collection device, and additional collection devices are required to cooperate with the floor scrubber, which leads to complicated operation and low efficiency, failing to meet customers' requirements. Most of indoor public areas are manually cleaned, which brings increased labor intensity.

Household mopping machines are developed based on sweeping machines (i.e, small vacuum cleaner). Specifically, the small vacuum cleaner is additionally provided with an intelligent walking device, and is further provided with a mopping cloth on the bottom and a water-dripping box to realize the mopping function. However, such mopping machine mops the floor passively rather than actively, and thus has a poor mopping effect. Moreover, the floor mopping machine cannot enter spaces smaller than its own size, so it cannot mop the ground in a narrow space. The mopping cloth is easy to become dirty and muddy, and cannot be cleaned automatically. Thus, the mopping cloth has to be manually cleaned repeatedly, which still fails to reduce the labor intensity. The mopping mechanism is too simple, in which the mopping cloth with a small size is fixedly attached to the bottom of the machine and passively contacts the ground, so that it cannot be cleaned at any time. During use, the mopping cloth has to be manually detached for cleaning. In addition, the dirt is easy to be left when such mopping machine makes a turn and reverses. The existing mopping machines are simple in structure and similar in technical design. Thus, there is an urgent need to design a mopping machine with improved performance in relation to the existing products.

SUMMARY

The present disclosure aims to provide a floor mopping machine equipped with a cleaning system. A mopping cloth can be cyclically used for mopping the floor. A spray system is configured to keep the mopping cloth clean and moist during the mopping process. The dirt can be automatically sorted or sucked into the dirt collection container, and at the same time, the garbage on the floor can be scrubbed, sucked and swept to clean the floor. Therefore, the machine provided herein achieves the integration of sucking, scrubbing, mopping and sweeping. At the same time, the main machine is equipped with an auxiliary machine which is extended from the main machine based on the leverage principle, solving the technical problem that the existing floor mopping machines cannot mop the floor in a small space.

In addition, the floor mopping machine is capable of surmounting obstacles and walking in an S shape. The charging pile is vertically arranged and does not occupy too much indoor space. The mopping machine has a small height, so it can enter the bottom of the furniture to mop the floor under the furniture. After the operation is completed, the cleaning device will automatically spray cleaning liquids and water onto the mopping cloth when connected to the charging pile, so as to clean the mopping cloth again. The floor mopping machine is capable of being automatically cleaned. A high-power dust suction motor is adopted, and the floor is first sucked and then mopped, or first scrubbed and then mopped, ensuring a better cleaning effect. It is environmental-friendly, low in cost and ingenious in structure. In summary, the floor mopping machine of the disclosure is a mopping-sweeping integrated machine without manual cleaning of the mopping cloth, and thus it can greatly reduce the labor consumption.

Technical solutions of the present disclosure are described as follows.

Provided is a floor mopping machine. A screen is arranged on a top of the casing, and a laser navigator is arranged on a top of the screen; an auxiliary machine is accommodated in a left side of the casing; the auxiliary machine is connected to an extension arm through a joint motor, and the extension arm is connected to the telescopic rod through the joint motor; the telescopic rod is connected to a third motor which is arranged in front of the battery;

a partition plate is arranged at a middle of the casing, and the battery is arranged at a side of the partition plate; a first support roller is provided at an end of the battery away from the third motor, and a second support roller is provided diagonally above the first support roller; a set of second pressure rollers are arranged between the first support roller and the second support roller, and a set of third pressure rollers are arranged between the first support roller and a first driving roller; the first motor is capable of driving the first driving roller to rotate around an axis of the first driving roller;

a mounting frame is provided at a side of the partition plate away from the battery, and the mounting frame cooperates with the set of first pressure rollers to place the auxiliary machine; a second driving roller is provided at a front side of the set of the first pressure rollers, and a third support roller is provided at a rear side of the set of the first pressure rollers; a fourth support roller is provided diagonally above the third support roller; a set of fourth pressure rollers are arranged between the third support roller and the fourth support roller; the second motor is capable of driving the second driving roller to rotate;

the battery is configured to transmit voltages to the first motor and the second motor, respectively;

the second support roller and the fourth support roller are arranged in a recess of the first rear cover; a top of the first rear cover is mounted in a body of the laser navigator; the body of the laser navigator is placed on a support plate, and a water tank is provided at a lower end of the support plate; a water inlet is provided at a front end of the water tank, and a water spray port is provided below the water inlet; a fluid is delivered to the water spray port through a water pump or a cleaning liquid pump, and the fluid from the water spray port flows to the brush; a first cleaning member is provided at a rear side of the brush; a driven wheel is provided at a bottom of the first rear cover, and a first trash collection container is provided at a side of the first cleaning member close to the driven wheel.

a scraper plate is provided between the water inlet and the water spray port, and both ends of the scraper plate are respectively connected to a first driven gear; the fourth motor is connected to a first driving gear, and the first driving gear meshes with the first driven gear; the fourth motor is configured to drive the first driving gear to rotate around an axis of the first driving gear, so as to drive the first driven gear to rotate around an axis of the first driven gear.

A fixing plate is provided at an upper end of the partition plate and is connected to a motor plate; a fifth motor is arranged at a center of the motor plate and is connected to a second driving gear; the second driving gear meshes with a second driven gear and a third driven gear, respectively; the second driven gear meshes with a fourth driven gear, and the fourth driven gear meshes with a fifth driven gear; the fifth driven gear meshes with a sixth driven gear, and the sixth driven gear meshes with a seventh driven gear;

the third driven gear meshes with an eighth driven gear, and the eighth driven gear meshes with a ninth driven gear; the ninth driven gear meshes with a tenth driven gear, and the tenth driven gear meshes with an eleventh driven gear; and the second driven gear, the fifth driven gear, the seventh driven gear, the third driven gear, the ninth driven gear and the eleventh driven gear are respectively connected to vertical brushes, and a second cleaning member is provided at each side of each of the vertical brushes.

The battery is arranged at one side of the partition plate, and a dust suction box is provided at the other side of the partition plate. A front side of the partition plate is connected to the first dust suction member through a first pipe; a first filter screen is provided at a rear end of the dust suction box, and connected to a motor box in which the sixth motor with a first fan is placed; and a side of the motor box is provided with a first air outlet; the motor box and the dust suction box are placed on the set of first pressure rollers and the third support roller.

A T-shaped dust suction pipe is provided on a top surface of the casing; a front end of the T-shaped dust suction pipe is connected to a second dust suction member, and a rear end of the T-shaped dust suction pipe is connected to a second trash collection container; a second filter screen is provided at a rear end of the second trash collection container, and a seventh motor with a second fan is provided at a rear end of the second filter screen; a second air outlet is provided at a rear end of the seventh motor.

The auxiliary machine and a side of the main machine provided with the battery have the same structure.

The charging pile comprises a first charging arm shell and a second charging arm shell; an eighth motor is mounted inside a bottom of the first charging arm shell, and is movable on the first guide shaft; an outer end of the eighth motor is connected to a first support arm, and the first support arm is connected to a second support arm through a first fixing shaft; a bottom end of the second support arm is connected to a ninth motor, and the ninth motor is connected to a charged positive or negative terminal; the first support arm is clamped on a first vertical support plate, and the first vertical support plate is hinged to a first foldable support plate;

a tenth motor is mounted inside a bottom of the second charging arm shell and is movable on the second guide shaft; an outer end of the tenth motor is connected to a third support arm, and the third support arm is connected to a fourth support arm through a second fixing shaft; a bottom end of the fourth support arm is connected to an eleventh motor, and the eleventh motor is connected to a charged positive or negative terminal; the third support arm is clamped on the second vertical support plate, and the second vertical support plate is hinged to a second foldable support plate; and an infrared transmitter is mounted at a side of the two horizontal connecting plates and is configured to send an infrared signal to the infrared receiver; and the infrared receiver is arranged on the casing of the main machine.

The present invention has the following beneficial effects.

The floor mopping machine integrates the sweeping function and the mopping function, includes a circulating mopping cloth based on the principle of a triangular structure. In this way, the mopping cloth is rolled to mop the ground while the floor mopping machine is walking, so as to realize the moisturizing and mopping of stubborn dirt and to suck small particles to make the floor clean.

The floor mopping machine of the present invention has large sweeping power, a low height, and is water-saving and clean. The floor is cleaned with clean water in the whole cleaning process. There is a device for cleaning the mopping cloth and collecting trash behind the floor mopping mechanism, so that while the mopping machine is working, the cleaning device can clean the dirt on the surface of the mopping cloth anytime and anywhere, and sort the dirt into the dirt collection box. Besides, the cleaning device can also suck or scrub the trash on the floor at the same time.

The main machine with the auxiliary machine stops in a narrow place. First, the telescopic rod and the extension arm are extended to push out the auxiliary machine to mop the floor, so that the mopping machine is able to mop the floor in the narrow space since the mopping machine can enter the narrow space.

The floor mopping machine carries out scrubbing or suction first and then mopping, and is equipped with the auxiliary machine. High-power suction motor is used to improve the working efficiency. The floor mopping machine involves simple operations and is easy to repair and flexible to operate. The two motors respectively drive the mopping cloth with a triangular structure, so that the floor mopping machine has the ability to surmount obstacles and can turn flexibly.

The floor mopping machine of the present invention is capable of reversing and travelling in an S shape, which can completely replace the manual mopping or sweeping.

A thin and light TV screen is provided on the surface of the floor mopping machine, so that the advertisement can be broadcast through the wireless network. When the wiping machine is working, the screen will play non-disturbing audio videos and silent advertisements in a loop, allowing the advertisements to be broadcast at home.

The floor mopping machine can be used in families, enterprises and public institutions, government agencies, high-speed rail trains, hospitals, large, middle and elementary schools, small and medium-sized commercial supermarkets, service organizations, banks, hotels and other industries to replace the manual cleaning.

The first trash collection container, the water tank and the main machine in the rear cover of the present invention can be pulled apart, facilitating the cleaning of the first trash collection container and the brush and allowing water to be added to the water tank.

The telescopic rod of the present invention allows the auxiliary machine to extend from the mounting frame to facilitate the extension of the extension arm and the joint motor connected to the extension arm.

The support plates of the present invention can support the floor mopping machine to climb on the charging pile for charging, and they can also be used to support the floor mopping machine when the charging pile is lowered to make it slowly descend to the ground.

The first pressure rollers ensures that the mopping cloth closely contact with the floor.

The two mopping cloths can be easily removed from both sides of the main machine for replacement. On the other hand, the two mopping cloths replace the traveling wheels of the floor mopping machine, and the arrangement of the two mopping cloths facilitates the travelling and turning of the mopping machine, so that the floor mopping machine is capable of surmounting obstacles.

The power of the motor is not specifically limited herein.

The floor mopping machine has a triangular structure, which is convenient for the front end of the floor mopping machine to enter the bottom of the furniture or the bed for cleaning.

DETAILED DESCRIPTION OF EMBODIMENTS

Embodiment 1

Figure 1:
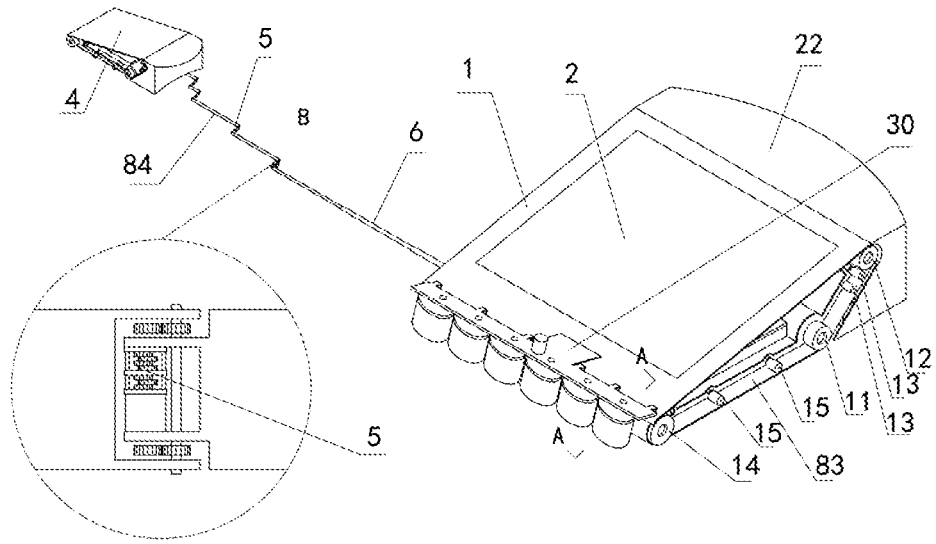
FIG. 1 is a schematic diagram of a floor mopping machine with front brushes according to an embodiment of the present disclosure, in which an auxiliary machine is extended.
Figure 2:
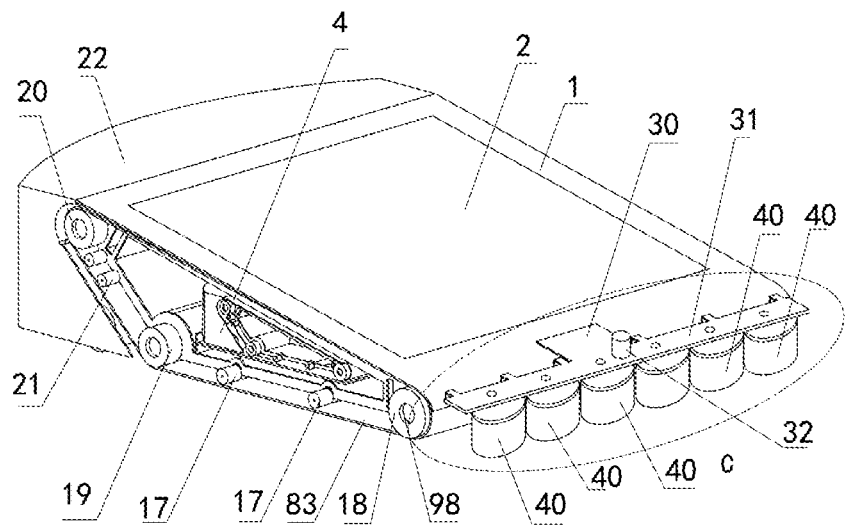
FIG. 2 is a perspective view of the floor mopping machine with the front brushes according to an embodiment of the present disclosure.
Figure 3:
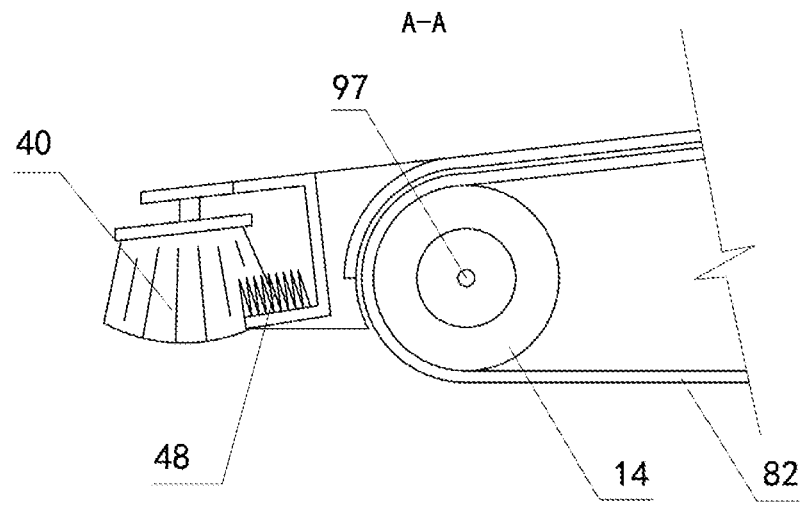
FIG. 3 is a cross-sectional view in FIG. 1 taken along line A-A.
Figure 4:
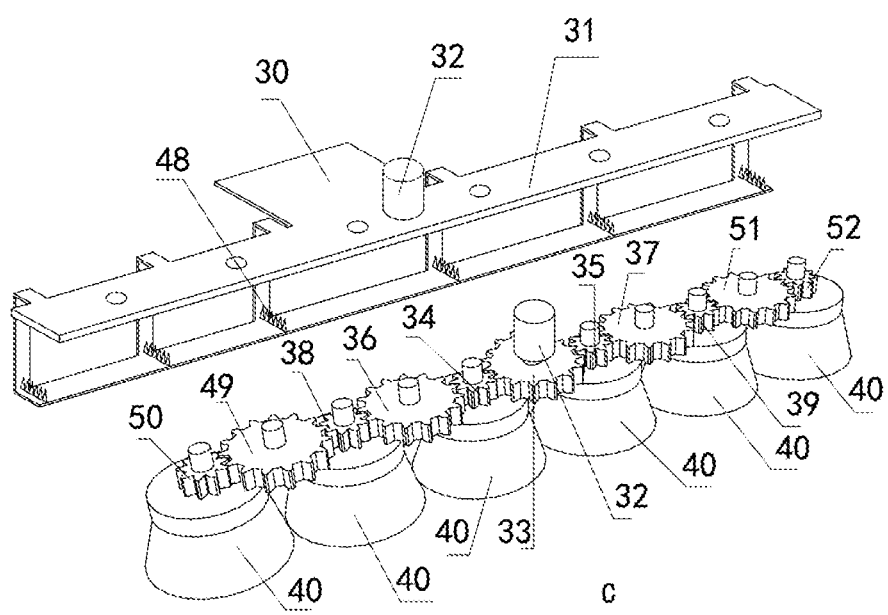
FIG. 4 is a schematic diagram of portion C in FIG. 2.
Figure 5:
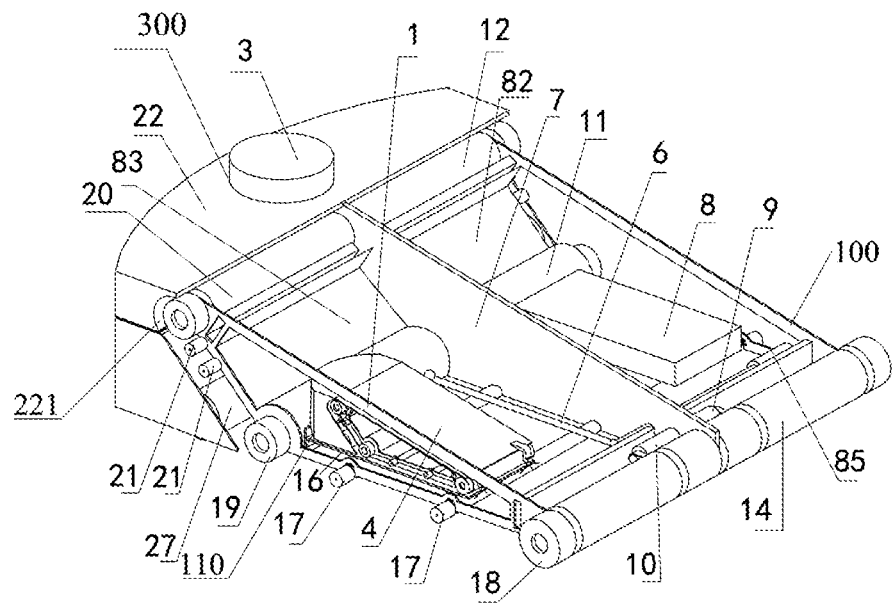
FIG. 5 is schematic diagram of the inside of the floor mopping machine with the auxiliary machine according to an embodiment of the present disclosure.
Figure 6:
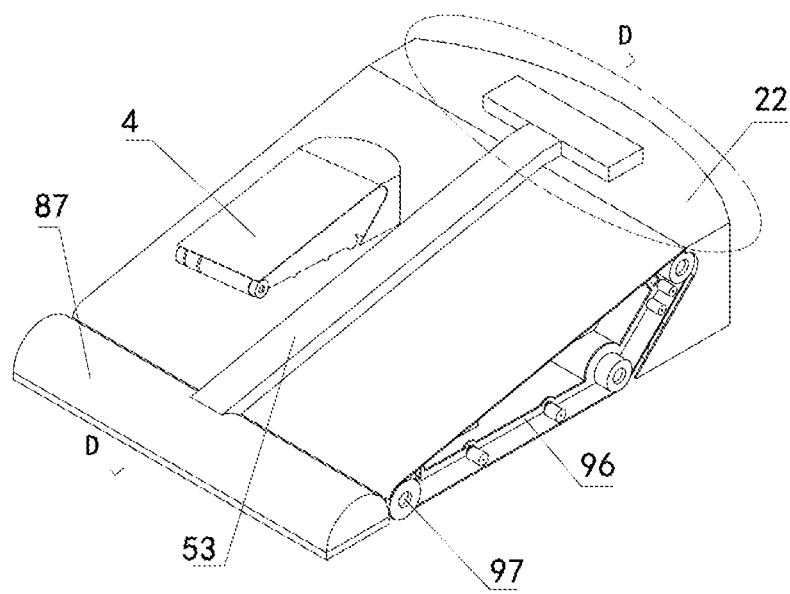
FIG. 6 is a front perspective view of the floor mopping machine with a dust suction member and the auxiliary machine according to an embodiment of the present disclosure.
Figure 7:
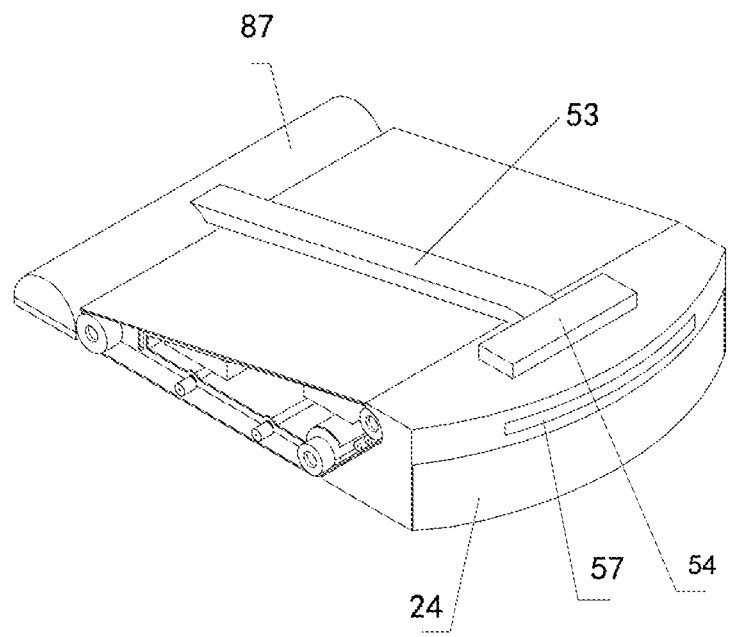
FIG. 7 is a rear perspective view of the floor mopping machine with the dust suction member and the auxiliary machine according to an embodiment of the present disclosure.
Figure 8:
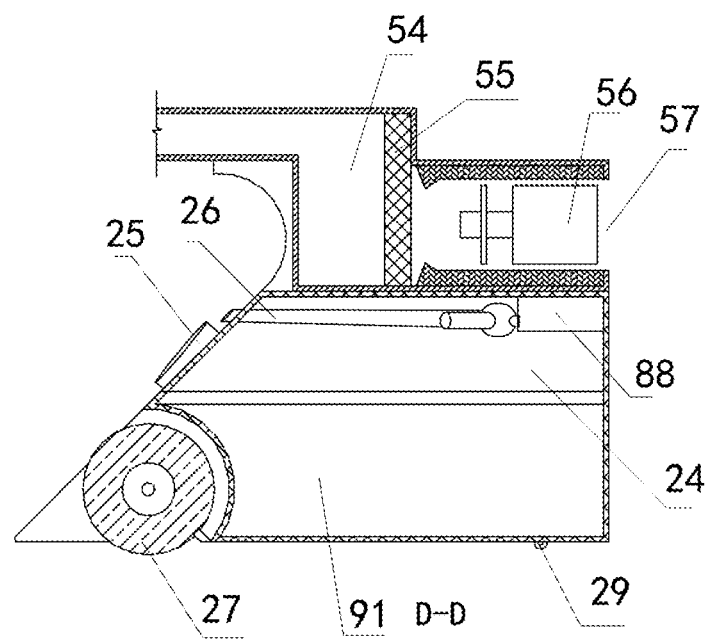
FIG. 8 is a cross-sectional view in FIG. 6 taken along line D-D.
Figure 9:
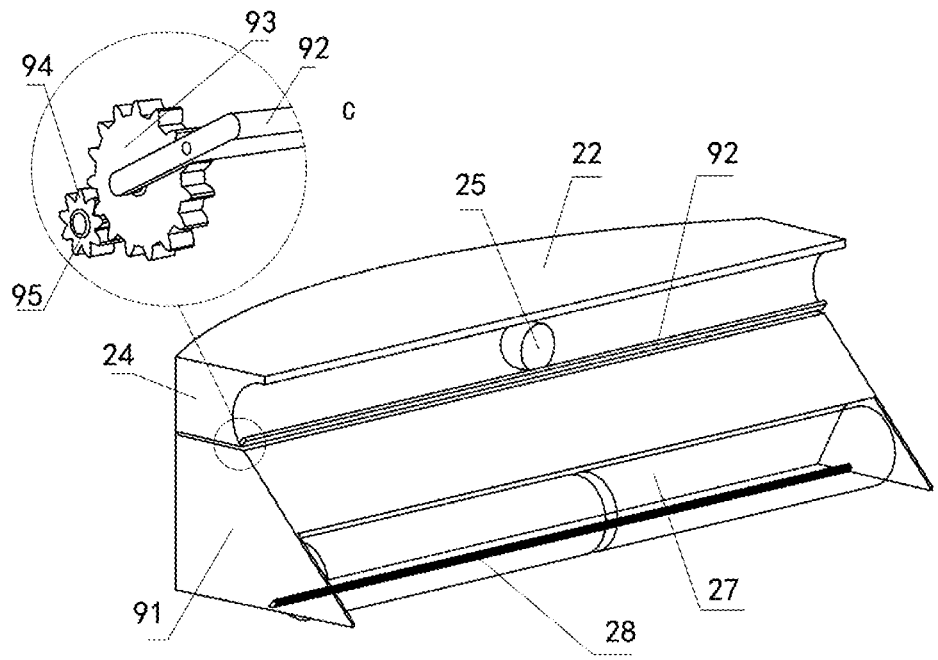
FIG. 9 is a schematic diagram of a rear cover in FIGS. 2 and 5.
Figure 10:
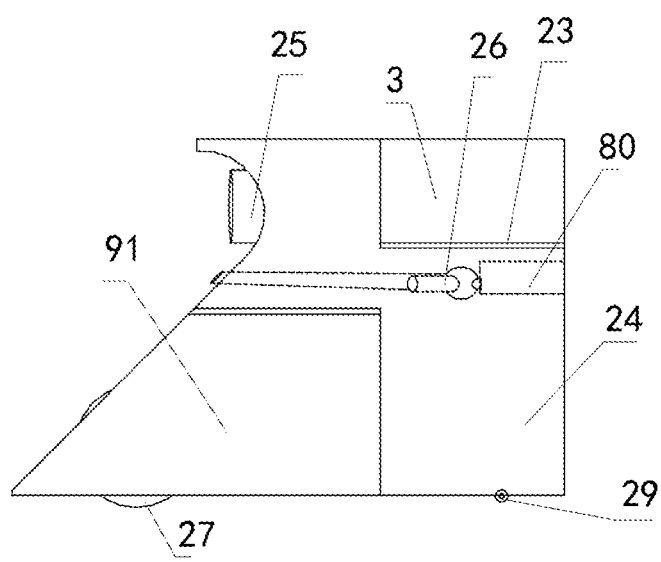
FIG. 10 is a cross-sectional view of the rear cover in FIGS. 2 and 5.
Figure 11:
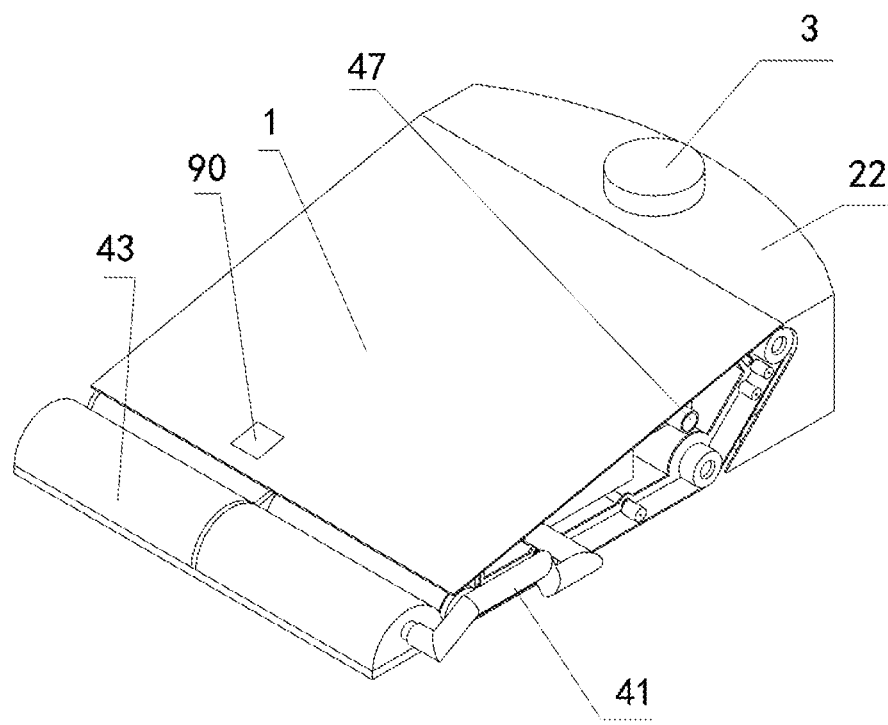
FIG. 11 is a schematic diagram of the floor mopping machine with an internal dust suction box according to an embodiment of the present disclosure.
Figure 12:
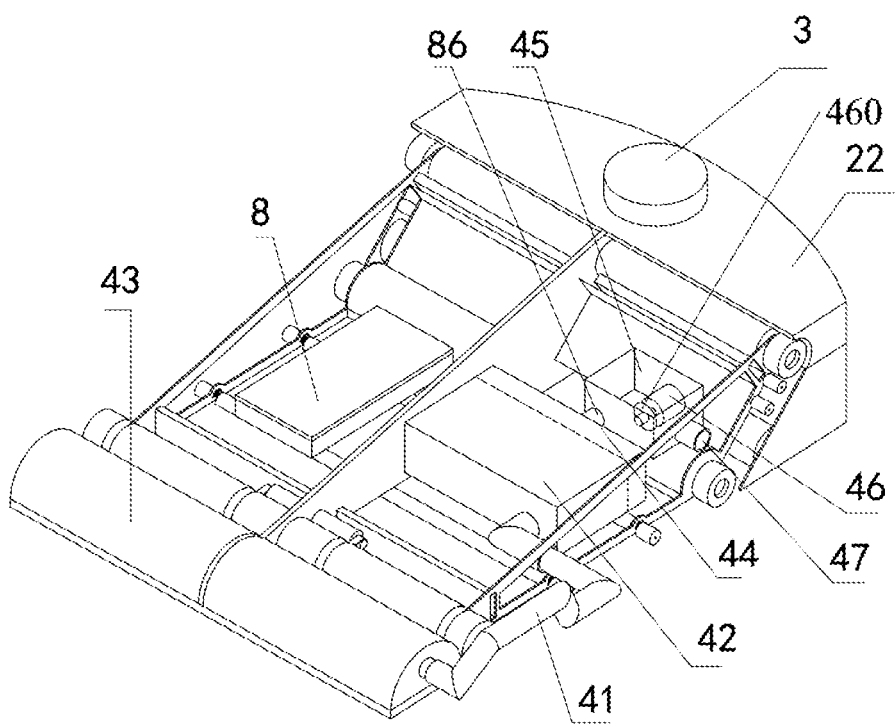
FIG. 12 is a schematic diagram of an interior of the floor mopping machine in FIG. 11.
Figure 13:
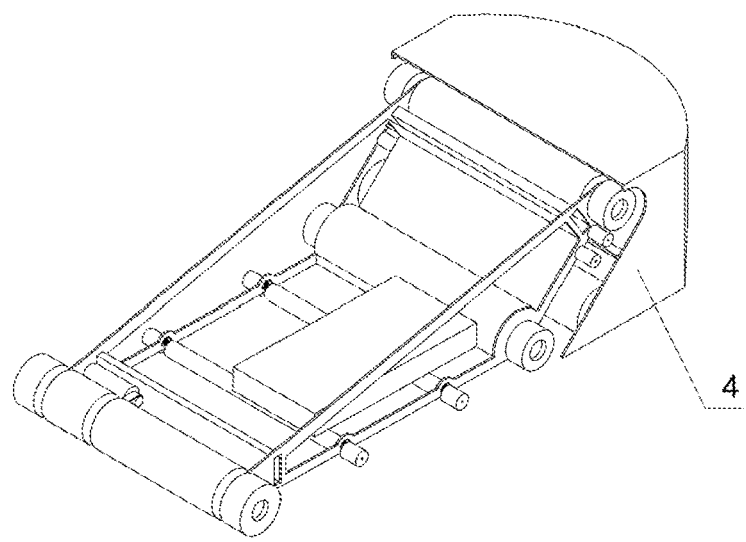
FIG. 13 is a schematic diagram of an interior of the auxiliary machine according to an embodiment of the present disclosure.
Figure 14:
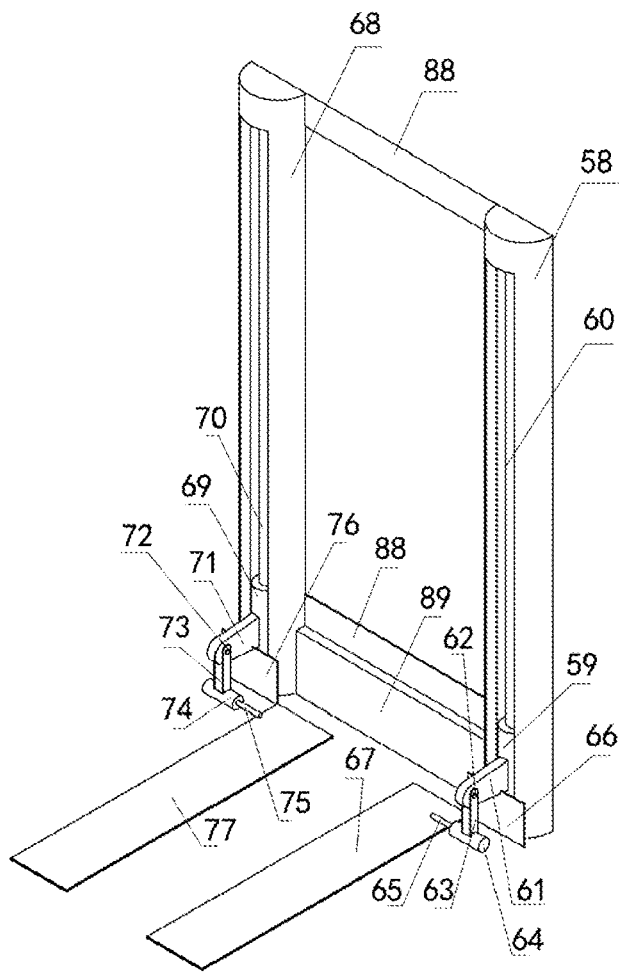
FIG. 14 is a schematic diagram of a charging pile according to an embodiment of the present disclosure.
Figure 15:
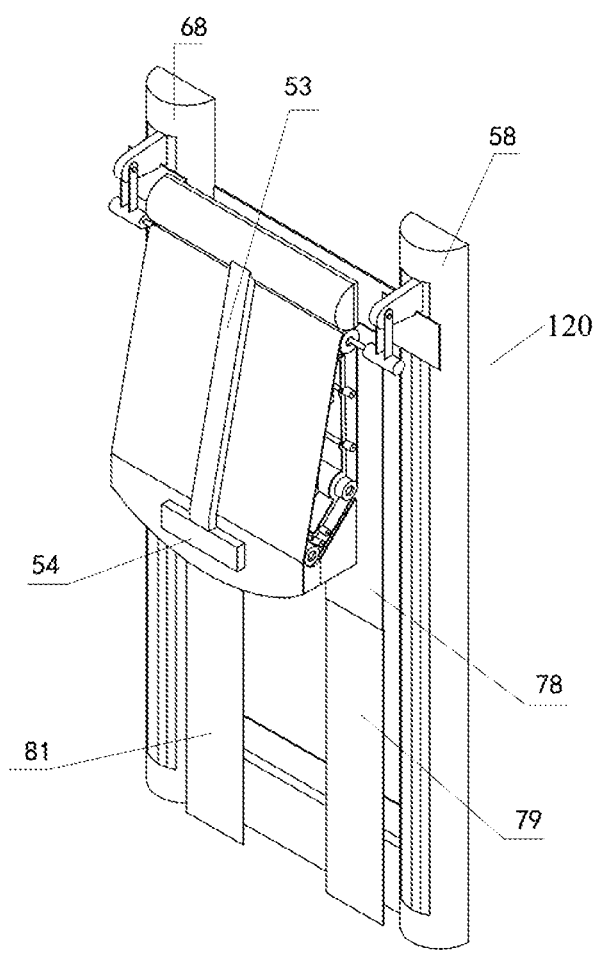
FIG. 15 is a schematic diagram of the floor mopping machine according to an embodiment of the present disclosure, in which the floor mopping machine is charging.
Figure 16:
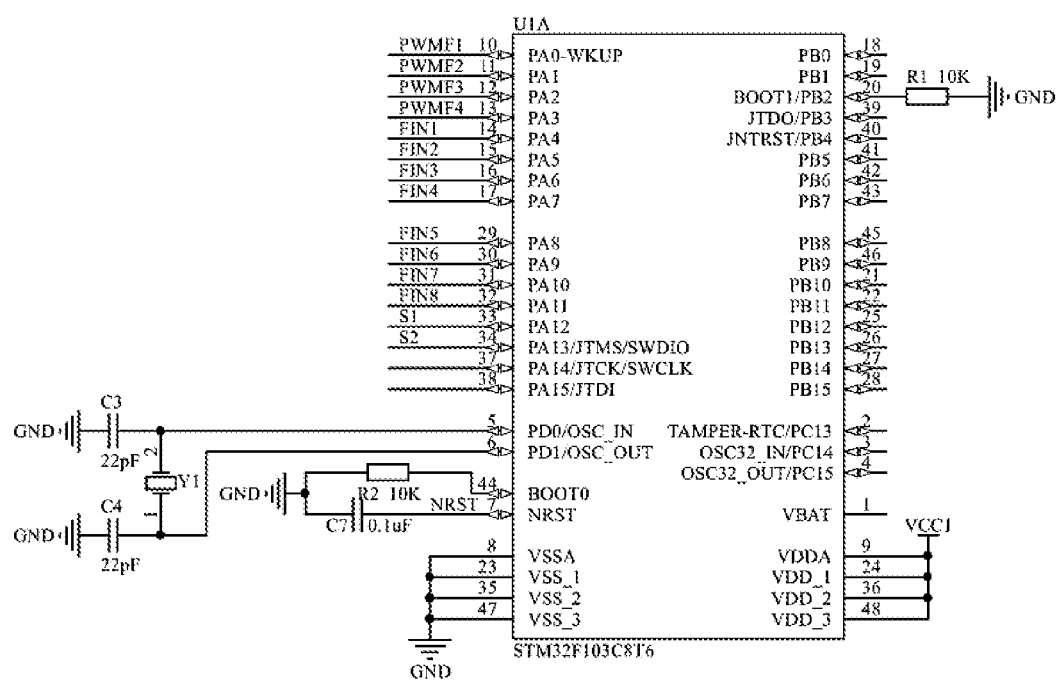
FIG. 16 is a circuit diagram of a chip U1A according to an embodiment of the present disclosure.
Figure 17A:
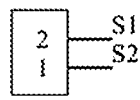
FIG. 17A is a circuit diagram of an infrared transceiver module according to an embodiment of the present disclosure.
Figure 17B:
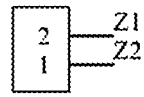
FIG. 17B is a circuit diagram of an eighth motor according to an embodiment of the present disclosure.
Figure 17C:
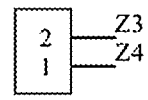
FIG. 17C is a circuit diagram of a tenth motor according to an embodiment of the present disclosure.
Figure 17D:
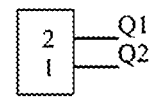
FIG. 17D is a circuit diagram of a ninth motor according to an embodiment of the present disclosure.
Figure 17E:
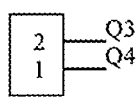
FIG. 17E is a circuit diagram of an eleventh motor according to an embodiment of the present disclosure.
Figure 18:
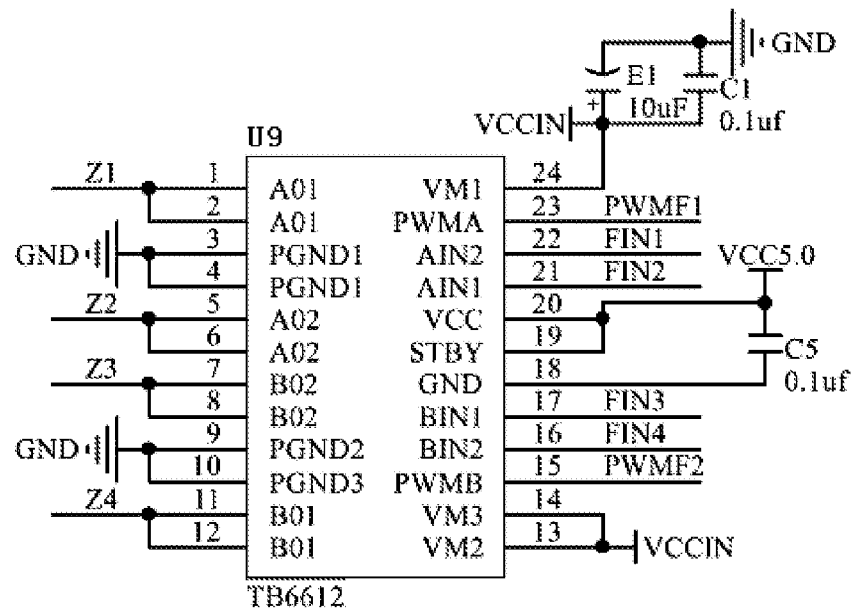
FIG. 18 is a start module of the eighth motor and the tenth motor according to an embodiment of the present disclosure.
Figure 19:
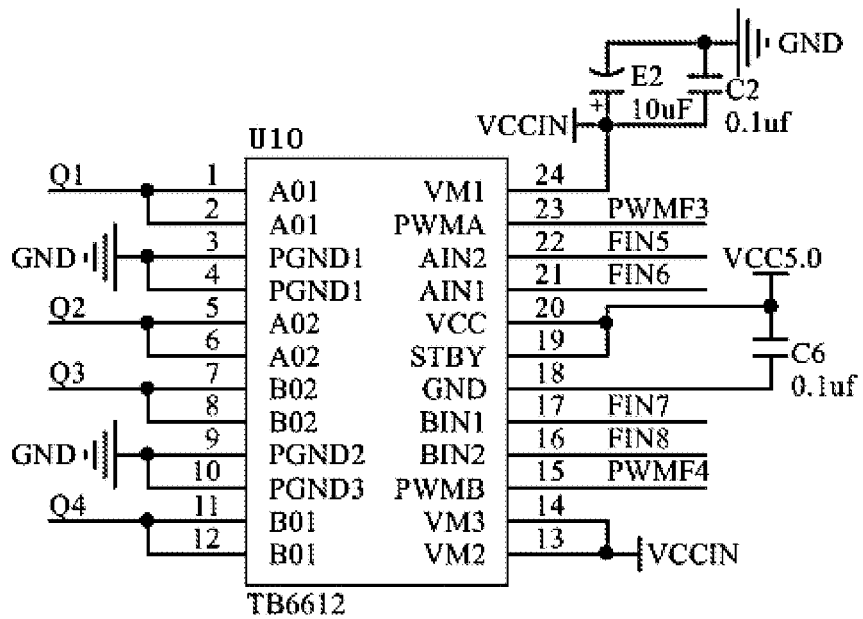
FIG. 19 is a start module of the ninth motor and the eleventh motor according to an embodiment of the present disclosure.
Figure 20:
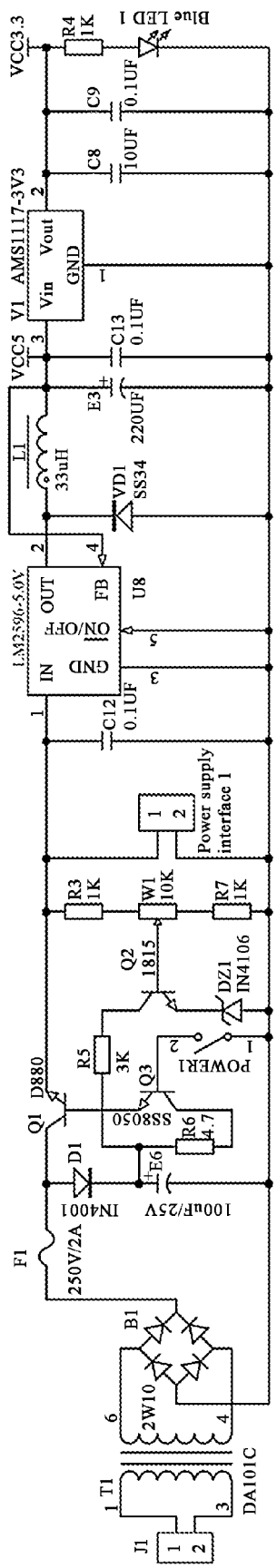
FIG. 20 is a circuit diagram of the charging pile and the mains according to an embodiment of the present disclosure.
Figures 21A, 21B:
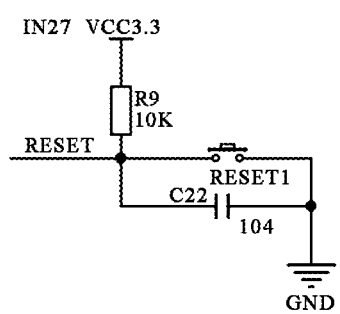
FIGS. 21A-E are circuit diagrams of minimum systems of a chip U4 according to an embodiment of the present disclosure.
Figure 21C:
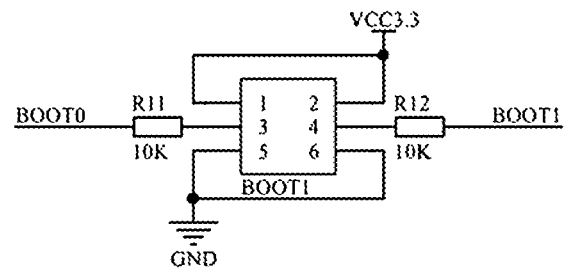
Figure 21D:
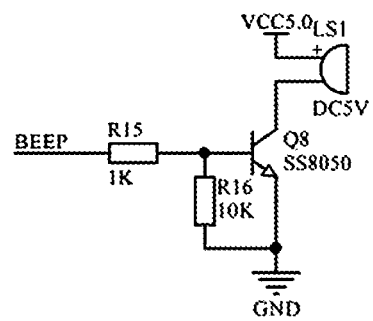
Figure 21E:
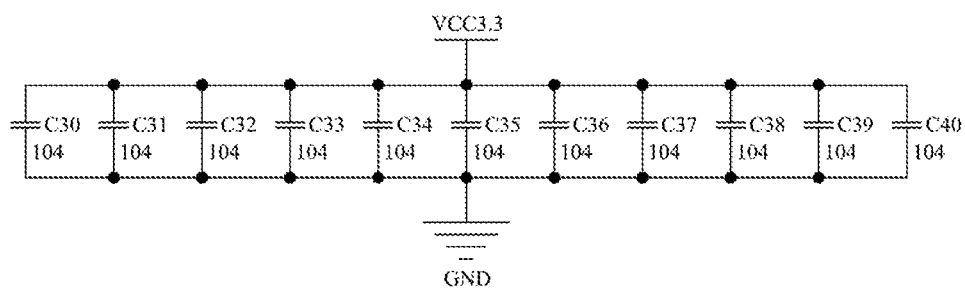
Figure 22A:
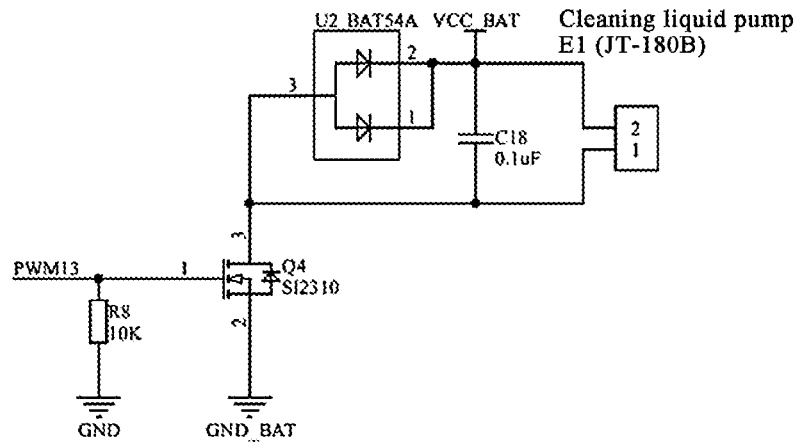
FIGS. 22A-E are driving circuits of a water pump or a cleaning liquid pump according to an embodiment of the present disclosure.
Figure 22B:
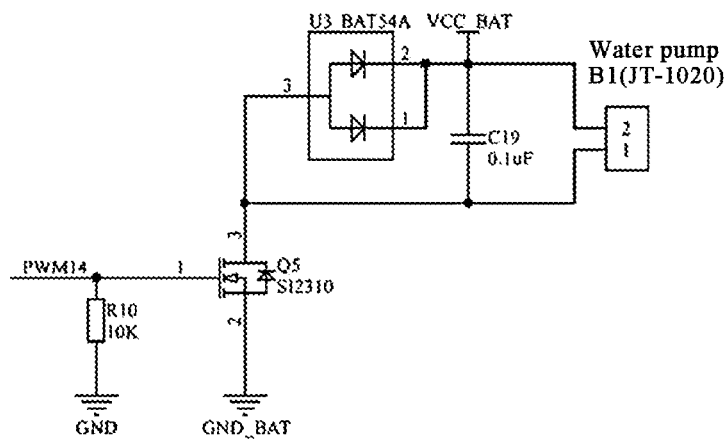
Figure 22C:
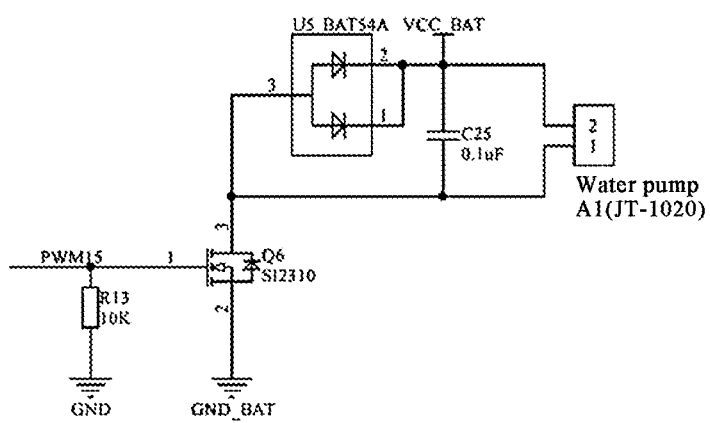
Figure 22D:
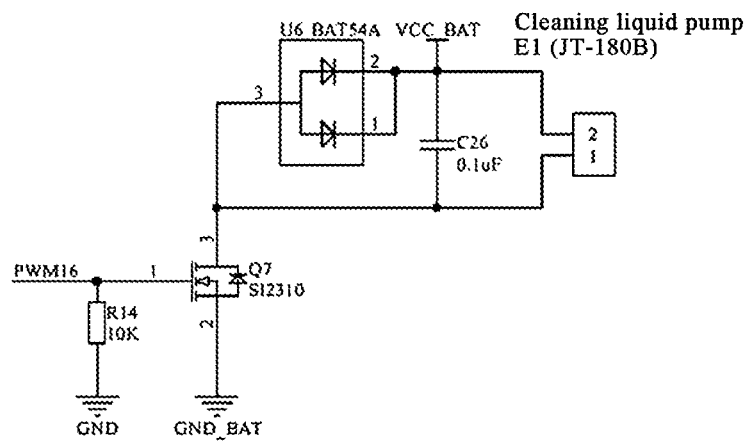
Figure 22E:
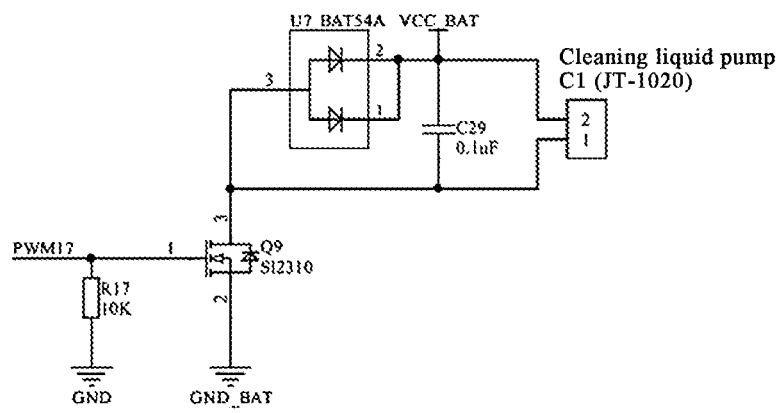
Figure 23A:
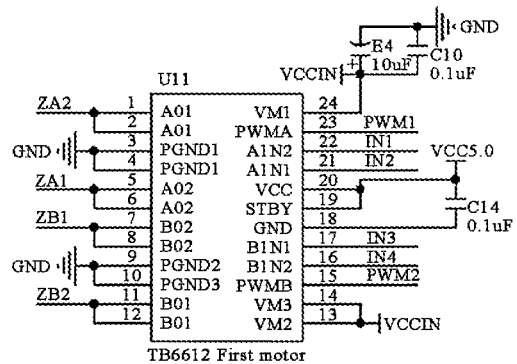
FIGS. 23A-F are circuit diagrams of joint motors, the fourth motor and the third motor according to an embodiment of the present disclosure.
Figure 23B:
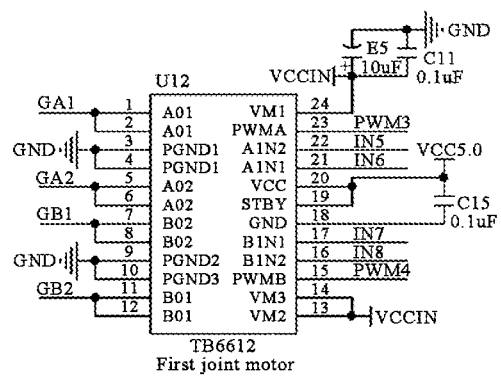
Figure 23C:
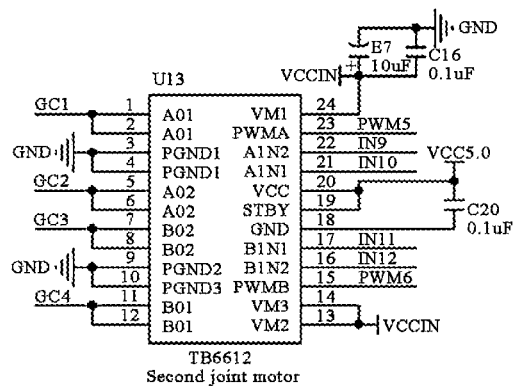
Figure 23D:
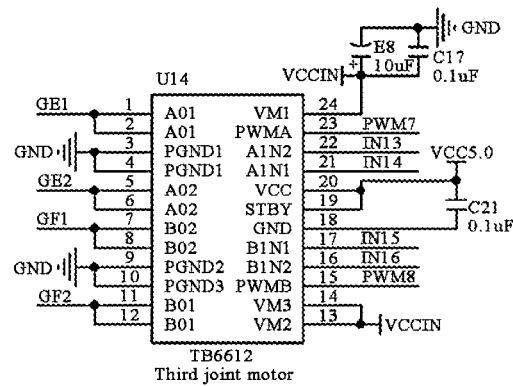
Figure 23E:
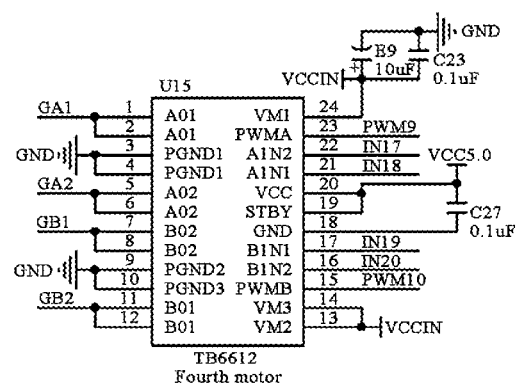
Figure 23F:
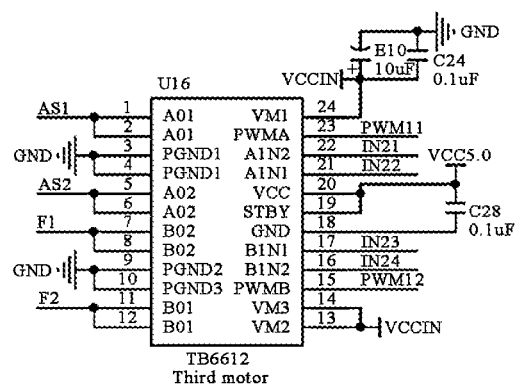
Figure 24A:
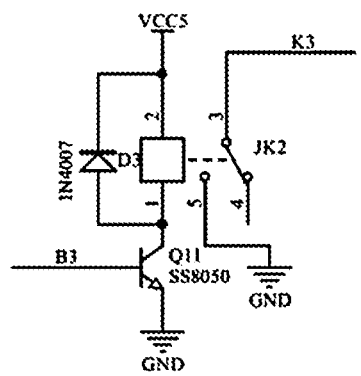
FIGS. 24A-C are control circuit diagrams of relays according to an embodiment of the present disclosure.
Figure 24B:
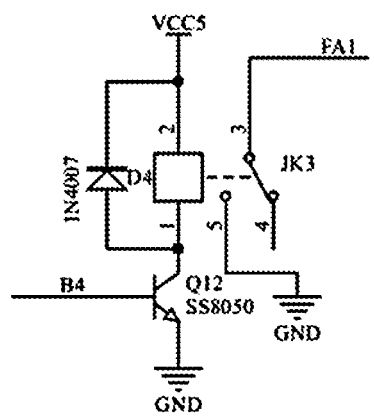
Figure 24C:
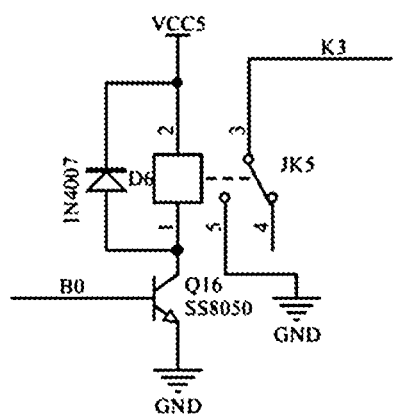
Figure 25:
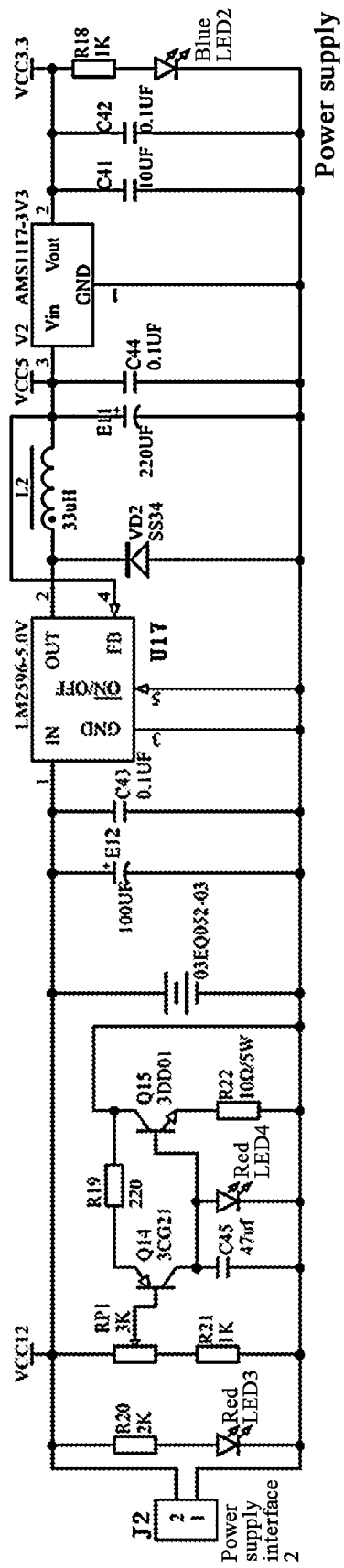
FIG. 25 is a circuit diagram of the power supply of the main machine according to an embodiment of the present disclosure.
Figure 26A:
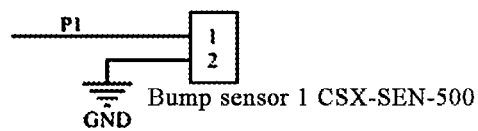
FIGS. 26A-H are circuit diagrams of interfaces of sensors according to an embodiment of the present disclosure.
Figure 26B:
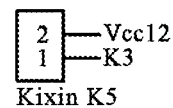
Figure 26C:
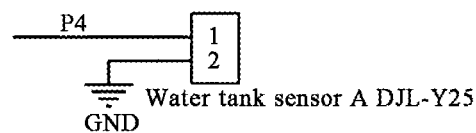
Figure 26D:
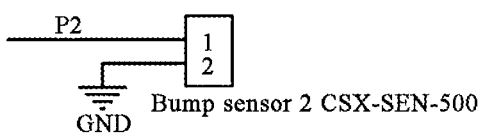
Figure 26E:
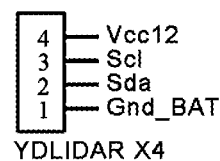
Figure 26F:
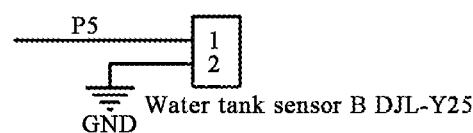
Figure 26G:
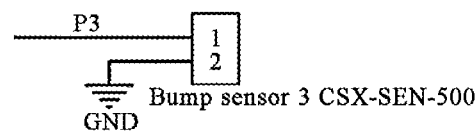
Figure 26H:
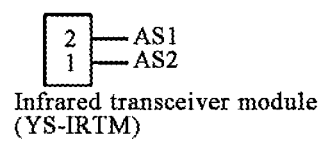
Figure 27A:
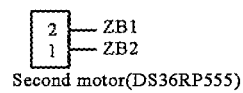
FIGS. 27A-N are circuit diagrams of interfaces of motors according to an embodiment of the present disclosure.
Figure 27B:
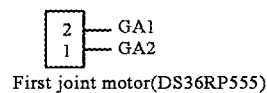
Figure 27C:
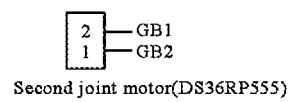
Figure 27D:
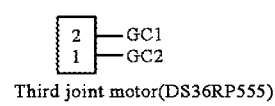
Figure 27E:
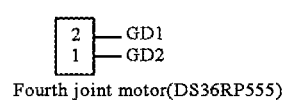
Figure 27F:
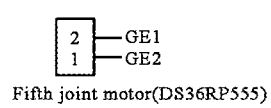
Figure 27G:
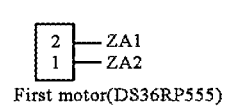
Figure 27H:
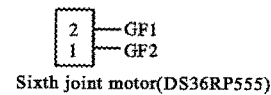
Figure 27I:
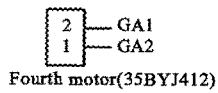
Figure 27J:
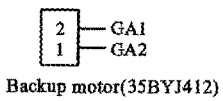
Figure 27K:
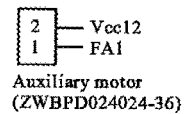
Figure 27L:
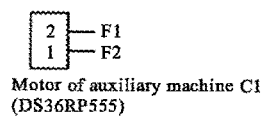
Figure 27M:
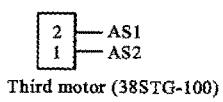
Figure 27N:
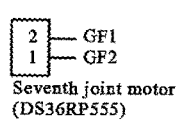

This embodiment provides a floor mopping machine. A top surface of a casing 1 is provided with a screen 2, and a laser navigator 3 is provided on an upper end of the screen 2. An auxiliary machine 4 is placed inside a left or right side of the casing 1, and is connected to an extension arm 84 through a joint motor 5. The extension arm 84 is connected to a telescopic rod 6 through the joint motor 5, and the telescopic rod 6 is connected to a third motor 85 which is arranged in front of a battery 8. A partition plate 7 is provided at a middle of the casing 1, and the battery 8 is provided at a right or left side of the partition plate 7.

An upper end of the battery 8 is provided with a first support roller 11, and a second support roller 12 is provided diagonally above the first support roller 11. A set of second pressure rollers 13 are arranged between the first support roller 11 and the second support roller 12, and a set of third pressure rollers 15 are arranged between the first support roller 11 and a first driving roller 14. The first driving roller 14 is driven by a second motor 10 and is provided with a right charging hole. A mounting frame 16 is provided on a set of first pressure rollers 17 at the left side of the partition plate 7, and is configured to place the auxiliary machine 4. A second driving roller 18 is provided at a front end of the set of first pressure rollers 17, and a third support roller 19 is provided at a rear end of the set of first pressure rollers 17. A fourth support roller 20 is arranged obliquely above the third support roller 19, and a set of fourth pressure rollers 21 are arranged between the third support roller 19 and the fourth support roller 20. The second driving roller 18 is driven by the first motor 9, and the battery 8 transmits voltages to the first motor 9 and the second motor 10 at the same time. The second support roller 12 and the fourth support roller 20 are arranged at a recess of a rear cover 22, and a body of the laser navigator 3 is arranged at an upper end of the rear cover 22 and is placed on a support plate 23.

A water tank 24 is provided at a lower end of the support plate 23, and a water inlet 25 is provided at a front end of the water tank 24. A water spray port 26 is provided below the water inlet 25, and water is fed to the water spray port 26 through a water pump or a cleaning liquid pump 80. Liquid from the water spray port 26 acts on a brush 27, and a first cleaning member 28 is provided at a rear end of the brush 27. A driven wheel 29 is provided at a lower end of the rear cover 22. A first cleaning cloth 82 is arranged between the first support roller 11, the second support roller 12, the set of second pressure rollers 13, the first driving roller 14 and a set of third pressure rollers 15. A second cleaning cloth 83 is arranged between the set of first pressure rollers 17, the second driving roller 18, the third support roller 19, the fourth support roller 20 and the set of fourth pressure rollers 21.

A scraper plate 92 is provided between the water inlet 25 and the water spray port 26. Both ends of the scraper plate 92 are respectively connected to a first driven gear 93. A fourth motor 95 is connected to a first driving gear 94, and the first driving gear 94 meshes with the first driven gear 93. The fourth motor 95 is configured to drive the first driving gear 94 to rotate around an axis of the first driving gear 94, so as to drive the first driven gear 93 to rotate around an axis of the first driven gear 93.

A fixing plate 30 is provided at an upper end of the partition plate 7 and is connected to a motor plate 31. A fifth motor 32 is arranged at a center of the motor plate 31 and is connected to a second driving gear 33. The fifth motor 32 is configured to drive the second driving gear 33 to rotate around an axis of the second driving gear 33. The second driving gear 33 meshes with a second driven gear 34 and a third driven gear 35. The second driven gear 34 meshes with a fourth driven gear 36, and the fourth driven gear 36 meshes with a fifth driven gear 38. The fifth driven gear 38 meshes with a sixth driven gear 49, and the sixth driven gear 49 meshes with a seventh driven gear 50. The third driven gear 35 meshes with an eighth driven gear 37, and the eighth driven gear 37 meshes with a ninth driven gear 39. The ninth driven gear 39 meshes with a tenth driven gear 51, and the tenth driven gear 51 meshes with an eleventh driven gear 52. The second driven gear 34, the fifth driven gear 38, the seventh driven gear 50, the third driven gear 35, the ninth driven gear 39 and the eleventh driven gear 52 are respectively connected to vertical brushes 40, and a second cleaning member 48 is provided at each side of each of the vertical brushes 40.

The battery is arranged at a left side of the partition plate 7, and a dust suction box 42 is provided at a right side of the partition plate 7. A front end of the dust suction box 42 is connected to a first dust suction member 43 through a first pipe 41, and a rear end of the dust suction box 42 is provided with a first filter screen 44. The first filter screen 44 is connected to the motor box 45 through a second tube 86, and a sixth motor 46 equipped with a first fan 460 is mounted in the motor box 45. A side of the motor box 45 is provided with a first air outlet 47, and the motor box 45 and the dust suction box 42 are placed on the set of first pressure rollers 17 and the third support roller 19.

A T-shaped dust suction pipe 53 is provided on a top surface of the casing 1. A front end of the T-shaped dust suction pipe 53 is connected to a second dust suction member 87, and a rear end of the T-shaped dust suction pipe 53 is connected to a second trash collection container 54. A second filter screen 55 is provided at a rear end of the second trash collection container 54, and a seventh motor 56 equipped with a second fan is provided at a rear end of the second filter screen 55. A second air outlet is provided at a rear end of the seventh motor 56.

The auxiliary machine 4 and a side of the main machine with the battery 8 have the same structure, and the rear cover of the auxiliary machine 4 and the rear cover 22 of the main machine are the same in structure.

A mopping cloth is mounted in the auxiliary machine 4.

The charging pile includes a first charging arm shell 58 and a second charging arm shell 68. The eighth motor 59 is mounted inside the first charging arm shell 58, and the eighth motor 59 is movable on the first guide shaft 60. An outer end of the eighth motor 59 is connected to the first support arm 61, and the first support arm 61 is connected to the second support arm 63 through a first fixing shaft 62. A bottom end of the second support arm 63 is connected to a ninth motor 64, and an output shaft of the ninth motor 64 is connected to a charged positive electrode or a charged negative electrode 65. The first support arm 61 is clamped on the first vertical support plate 66, and the first vertical support plate 66 is hinged to a first foldable support plate 67.

A tenth motor 69 is mounted inside the second charging arm shell 68 and is movable on the second guide shaft 70. An outer end of the tenth motor 69 is connected to a third support arm 71, and the third support arm 71 is connected to a fourth support arm 73 through a second fixing shaft 72. A bottom end of the fourth support arm 73 is connected to an eleventh motor 74, and an output shaft of the eleventh motor 74 is connected to a charged negative electrode or a charged positive electrode 75. The third support arm 71 is clamped on the second vertical support plate 76, and the second vertical support plate 76 is hinged to a second foldable support plate 77.

An infrared transmitter 89 is mounted at an outer side of the two horizontal connecting plates 88, and the infrared transmitter 89 cooperates with the infrared receiver 90 on the casing 1 of the main machine.

The first foldable support plate 67 includes a first support element 78 and a second support element 79 which are hinged to each other. The second foldable support plate 77 includes a third support element and a fourth support element 81 which are hinged to each other.

The floor mopping machine is vertically arranged during charging, which can save floor spaces, so that the mopping cloth can be cleaned when the floor mopping machine is charging. The waste water generated from cleaning the mopping cloth falls into the first trash collection container 91.

The charged negative electrode or charged positive electrode 75 or the charged positive electrode or charged negative electrode 65 is inserted into the charging hole 97 of the first driving roller 14 or the charging hole 98 of the second driving roller 18.

The partition plate 7 is fixedly connected to a support frame 96, and the support frame 96 fixes and supports the first support roller 11, the second support roller 12, the second pressure rollers 13, the first driving roller 14, the third pressure rollers 15, the first pressure rollers 17, and the second driving roller 18, the third support roller 19, the fourth support roller 20 and the fourth pressure rollers 21, so that the first support roller 11, the second support roller 12, the second pressure rollers 13, the first driving roller 14, the third pressure rollers 15, the first pressure rollers 17, and the second driving roller 18, the third support roller 19, the fourth support roller 20 and the fourth pressure rollers 21 are balanced to ensure the normal work of the floor mopping machine. Each of the first pressure rollers 17 and the third pressure rollers 15 is equipped with a vertical spring, and the spring ensures close contacts between each of the first pressure rollers 17 and the third pressure rollers 15 and the mopping cloth.

Embodiment 2

A pin of the floor mopping machine passes through a transformer T1 and a bridge B1, and then connects to a fuse F1 and then to a terminal of a diode D1 and a collector c of a transistor Q1. An emitter e of the transistor Q1 is connected to a terminal of a resistor R3, a 1st terminal of the power interface J1, a terminal of a capacitor C12 and a 1st terminal of a switch-mode voltage regulator U8. A 2nd terminal of the switch-mode voltage regulator U8 is connected to one terminal of an inductor L1 and one terminal of a diode VD1, and the other terminal of the inductor L1 is connected to one terminal of a capacitor E3, a 4th terminal of the switch-mode voltage regulator U8, one terminal of a capacitor C13, a working voltage VCC5 and a third terminal of a voltage regulator chip V1. A 2nd terminal of the voltage regulator chip V1 is connected to one terminal of a capacitor C8, one terminal of a capacitor C9, one terminal of a resistor R4, and a working voltage VCC3.3, and the other terminal of the resistor R4 is connected to one terminal of a blue LED LED1. The other terminal of the resistor R3 is connected to one terminal of a slide rheostat W1, and the other terminal of the slide rheostat W1 is connected to one terminal of a resistor R7. A 3rd terminal of the slide rheostat W1 is connected to a base b of a transistor Q2, and an emitter e of the transistor Q2 is connected to one terminal of a Zener diode DZ1, and a collector c of the transistor Q2 is connected to one terminal of a resistor R5. The other terminal of the resistor R5 is connected to one terminal of a resistor R6, the other terminal of the diode D1 and one terminal of a capacitor E6. The other terminal of the resistor R6 is connected to a collector c of a transistor Q3, and an emitter e of the transistor Q2 is connected to a base b of the transistor Q1, and a base b of the transistor Q3 is connected to a second terminal of a switch POWER1.

The bridge B1 is further connected to the other terminal of the capacitor E6, a first terminal of the switch POWER1, the other terminal of the Zener diode DZ1, the other terminal of the resistor R7, the 2nd terminal of the power interface J1, the other terminal of the capacitor C12, and a 3rd terminal and a fifth terminal of the switch-mode voltage regulator U8, the other terminal of the diode VD1, the other terminal of the capacitor E3, the other terminal of the capacitor C13, a 1st terminal of the voltage regulator chip V1, and the other terminal of the capacitor C8, the other terminal of the capacitor C9 and the other terminal of the blue LED LED1.

The charging pile includes a chip U1A. A 5th terminal of the chip U1A is connected to one terminal of a capacitor C3 and a 2nd terminal of a crystal oscillator Y1, and a 6th terminal of the chip U1A is connected to one terminal of a capacitor C4 and a 1st terminal of the crystal oscillator Y1. The other terminal of the capacitor C3 and the other terminal of the capacitor C4 are grounded.

A 44th terminal of the chip U1A is connected to one terminal of the resistor R2, and a 7th terminal of the chip U1A is connected to one terminal of a capacitor C7. The other terminal of the resistor R2 is connected to the other terminal of the capacitor C7 and then grounded. A 8th terminal of the chip U1A is connected to a 23rd terminal, a 35th terminal and a 47th terminal of the chip U1A, and the 8th terminal, the 23rd terminal, the 35th terminal and the 47th terminal of the chip U1A are grounded. A 20th terminal of the chip U1A is connected with a resistor R1 in series and then grounded. A 9th terminal of the chip U1A is connected to a 24th terminal, a 36th terminal and a 48th terminal of the chip U1A, and the 9th terminal, the 24th terminal, the 36th terminal and the 48th terminal of the chip U1A are connected to a working voltage VCC1.

A 10th terminal of the chip U1A is connected to a 23rd terminal of a chip U9, and a 11th terminal of the chip U1A is connected to a 15th terminal of the chip U9. A 14th terminal of the chip U1A is connected to a 22nd terminal of the chip U9, and a 15th terminal of the chip U1A is connected to a 21st terminal of the chip U9. A 16th terminal of the chip U1A is connected to a 17th terminal of the chip U9, and a 17th terminal of the chip U1A is connected to a 16th terminal of the chip U9. A 1st terminal of the chip U9 is connected to a 2nd terminal of the chip U9 and then to a 2nd terminal of the eighth motor 59. A 5th terminal of the chip U9 is connected to a 6th terminal of the chip U9 and then to a 1st terminal of the 8th motor 59. A 7th terminal of the chip U9 is connected to a 8th terminal of the chip U9 and then to a 2nd terminal of the tenth motor 69. An 11th terminal of the chip U9 is connected to a 12th terminal of the chip U9 and then to a 1st terminal of the tenth motor 69. A 13th terminal of the chip U9 is connected to a 14th terminal of the chip U9 and then to the working voltage VCCIN. A 18th terminal of the chip U9 is connected to one terminal of a capacitor C5, and the other terminal of the capacitor C5 is connected to a 19th terminal of the chip U9, a 20th terminal of the chip U9 and a working voltage VCC5.0. A 24th terminal of the chip U9 is connected to a working voltage VCCIN and one terminal of a capacitor E1. A 12th terminal of the chip U1A is connected to a 23rd terminal of a chip U10, and a 11th terminal of the chip U1A is connected to a 15th terminal of the chip U10. A 14th terminal of the chip U1A is connected to a 22nd terminal of the chip U10, and a 15th terminal of the chip U1A is connected to a 21st terminal of the chip U10. A 16th terminal of the chip U1A is connected to a 17th terminal of the chip U10, and a 17th terminal of the chip U1A is connected to a 16th terminal of the chip U10. A 1st terminal of the chip U10 is connected to a 2nd terminal of the chip U10, and then to a 2nd terminal of a ninth motor 64. A 5th terminal of the chip U10 is connected to a 6th terminal of the chip U10, and then to a 1st terminal of the ninth motor 64. A 7th terminal of the chip U10 is connected to an 8th terminal of the chip U10, and then to a 2nd terminal of an eleventh motor 74. A 11th terminal of the chip U10 is connected to a 12th terminal of the chip U10, and then to a 1st terminal of the eleventh motor 74. A 13th terminal of the chip U10 is connected to a 14th terminal of the chip U10, and then to the working voltage VCCIN. A 18th terminal of the chip U10 is connected to one terminal of a capacitor C6, and the other terminal of the capacitor C6 is connected to a 19th terminal of the chip U10, a 20th terminal of the chip U10, and the working voltage VCC5.0.

Embodiment 3

In the floor mopping machine illustrated in embodiment 1, a 71th terminal of a chip U4 is connected to one terminal of a resistor R8 and a gate G of a field effect tube Q4, and a drain D of the field effect tube Q4 is connected to one terminal of a capacitor C18, a 3rd terminal of the chip U2 and a 1st terminal of a cleaning liquid pump E1. A 1st terminal of the chip U2 is connected to a 2nd terminal of the chip U2, the other terminal of the capacitor C18 and a 2nd terminal of the cleaning liquid pump E1. A source S of the field effect tube Q4 is grounded.

A 77th terminal of a chip U4 is connected to one terminal of a resistor R10 and a gate G of a field effect tube Q5, and a drain D of the field effect tube Q5 is connected to one terminal of a capacitor C19, a 3rd terminal of the chip U3 and a 1st terminal of a water pump B1. A 1st terminal of the chip U3 is connected to a 2nd terminal of the chip U3, the other terminal of a capacitor C19 and a 2nd terminal of a water pump B1. A source S of the field effect tube Q5 is grounded. A 35th terminal of the chip U4 is connected to one terminal of a resistor R13 and a gate G of the field effect tube Q6. A drain D of the field effect tube Q6 is connected to one terminal of a capacitor C25, a 3rd terminal of the chip U5 and a 1st terminal of a water pump A1. A 1st terminal of the chip U5 is connected to a 2nd terminal of the chip U5, the other terminal of the capacitor C25 and a 2nd terminal of the water pump A1. A source S of the field effect tube Q6 is grounded. A 36th terminal of the chip U4 is connected to one terminal of a resistor R14 and a gate G of a field effect tube Q7. A drain D of the field effect tube Q7 is connected to one terminal of a capacitor C26, a 3rd terminal of the chip U6 and a 1st terminal of a cleaning fluid pump D1. A 1st terminal of the chip U6 is connected to a 2nd terminal of the chip U6, the other terminal of a capacitor C26 and a 2nd terminal of the cleaning liquid pump D1. A source S of the field effect tube Q7 is grounded. A 37th terminal of the chip U4 is connected to one terminal of a resistor R17 and a gate G of a field effect tube Q9. A drain D of the field effect tube Q9 is connected to one terminal of a capacitor C29, a 3rd terminal of a chip U7 and a 1st terminal of a cleaning liquid pump C1. A 1st terminal of the chip U7 is connected to a 2nd terminal of the chip U7, the other terminal of the capacitor C29 and the 2nd terminal of the cleaning liquid pump C1. A source S of the field effect tube Q9 is grounded.

Embodiment 4

In the floor mopping machine illustrated in embodiment 1, a 1st terminal of the motor drive module U11 is connected to a 2nd terminal of the motor drive module U11 and a 1st terminal of a first main motor 1. A 3rd terminal of the motor drive module U11 is connected to a 4th terminal of the motor drive module U11 and is grounded. A 5th terminal of the motor drive module U11 is connected to a 6th terminal of the motor drive module U11 and a 2nd terminal of the first main motor. A 7th terminal of the motor drive module U11 is connected to an 8th terminal of the motor drive module U11 and a 2nd terminal of a second main motor. A 9th terminal of the motor drive module U11 is connected to a 10th terminal of the motor drive module U11 and is grounded. An 11th terminal of the motor drive module U11 is connected to a 12th terminal of the motor drive module U11 and a 1st terminal of the second main motor. A 13th terminal of the motor drive module U11 is connected to a 14th terminal of the motor drive module U11 and a VCCIN terminal of a product voltage. A 15th terminal of the motor drive module U11 is connected to a 24th terminal of the chip U4, and a 16th terminal of the motor drive module U11 is connected to a 92nd terminal of the chip U4. A 17th terminal of the motor drive module U11 is connected to a 91st terminal of the chip U4, and a 18th terminal of the motor drive module U11 is connected to one terminal of the capacitor C14. A 19th terminal of the motor drive module U11 is connected to a 20th terminal of the motor drive module U11, the other terminal of the capacitor C14, and the working voltage 5.0. A 21st terminal of the motor drive module U11 is connected to a 90th terminal of the chip U4, and a 22nd terminal of the motor drive module U11 is connected to a 89th terminal of the chip U4. A 23rd terminal of the motor drive module U11 is connected to a 23rd terminal of the chip U4. A 24th terminal of the motor drive module U11 is connected to the working voltage VCCIN, one terminal of the capacitor E4 and one terminal of the capacitor C10, and the other terminal of the capacitor E4 is connected to the other terminal of the capacitor C10 and then grounded.

A 1st terminal of a motor drive module U12 is connected to a 2nd terminal of the motor drive module U12 and a 1st terminal of a first joint motor. A 3rd terminal of the motor drive module U12 is connected to a 4th terminal of the motor drive module U12 and is grounded. A 5th terminal of the motor drive module U12 is connected to a 6th terminal of the motor drive module U12 and a 2nd terminal of the first joint motor. A 7th terminal of the motor drive module U12 is connected to an 8th terminal of the motor drive module U12 and a 2nd terminal of the second joint motor. A 9th terminal of the motor drive module U12 is connected to a 10th terminal of the motor drive module U12 and is grounded. An 11th terminal of the motor drive module U12 is connected to a 12th terminal of the motor drive module U12 and a 1st terminal of the second joint motor. A 13th terminal of the motor drive module U12 is connected to a 14th terminal of the motor drive module U12 and a VCCIN terminal of the product voltage. A 15th terminal of the motor drive module U12 is connected to a 26th terminal of the chip U4, and a 16th terminal of the motor drive module U12 is connected to a 47th terminal of the chip U4. A 17th terminal of the motor drive module U12 is connected to a 96th terminal of the chip U4, and a 18th terminal of the motor drive module U12 is connected to one terminal of the capacitor C15. A 19th terminal of the motor drive module U12 is connected to a 20th terminal of the motor drive module U12, the other terminal of the capacitor C15, and the working voltage 5.0. A 21th terminal of the motor drive module U12 is connected to a 95th terminal of the chip U4, and a 22th terminal of the motor drive module U12 is connected to a 93th terminal of the chip U4. A 23rd terminal of the motor drive module U12 is connected to a 25th terminal of the chip U4, and a 24th terminal of the motor drive module U12 is connected to the working voltage VCCIN, one terminal of a capacitor E5 and one terminal of a capacitor C11. The other terminal of the capacitor E5 is connected to the other terminal of the capacitor C11 and then grounded.

A 1st terminal of a motor drive module U13 is connected to a 2nd terminal of the motor drive module U13 and a 1st terminal of a third joint motor 1, and a 3rd terminal of the motor drive module U13 is connected to a 4th terminal of the motor drive module U13 and is grounded. A 5th terminal of the motor drive module U13 is connected to a 6th terminal of the motor drive module U13 and a 2nd terminal of the third joint motor. A 7th terminal of the motor drive module U13 is connected to an 8th terminal of the motor drive module U13 and a 2th terminal of a fourth joint motor. A 9th terminal of the motor drive module U13 is connected to a 10th terminal of the motor drive module U13 and is grounded. An 11th terminal of the motor drive module U13 is connected to a 12th terminal of the motor drive module U13 and a 1st terminal of the fourth joint motor. A 13th terminal of the motor drive module U13 is connected to a 14th terminal of the motor drive module U13 and the product voltage VCCIN terminal. A 15th terminal of the motor drive module U13 is connected to a 30th terminal of the chip U4, and a 16th terminal of the motor drive module U13 is connected to a 53rd terminal of the chip U4. A 17th terminal of the motor drive module U13 is connected to a 52th terminal of the chip U4, and a 18th terminal of the motor drive module U13 is connected to one terminal of a capacitor C20. A 19th terminal of the motor drive module U13 is connected to a 20th terminal of the motor drive module U13, the other terminal of the capacitor C20 and the working voltage of 5.0. A 21st terminal of the motor drive module U13 is connected to a 51st terminal of the chip U4, and a 22nd terminal of the motor drive module U13 is connected to a 48th terminal of the chip U4. A 23rd terminal of the motor drive module U13 is connected to a 29th terminal of the chip U4, and a 24th terminal of the motor drive module U13 is connected to the working voltage VCCIN, one terminal of a capacitor E7 and one terminal of a capacitor C16. The other terminal of the capacitor E7 is connected to the other terminal of the capacitor C16 and then grounded.

A 1st terminal of a motor drive module U14 is connected to a 2nd terminal of the motor drive module U14 and a 1st terminal of a fifth joint motor. A 3rd terminal of the motor drive module U14 is connected to a 4th terminal of the motor drive module U14 and is grounded. A 5th terminal of the motor drive module U14 is connected to a 6th terminal of the motor drive module U14 and a 2nd terminal of the fifth joint motor. A 7th terminal of the motor drive module U14 is connected to an 8th terminal of the motor drive module U14 and a 2nd terminal of a sixth joint motor. A 9th terminal of the motor drive module U14 is connected to a 10th terminal of the motor drive module U14 and is grounded. An 11th terminal of the motor drive module U14 is connected to a 12th terminal of the motor drive module U14 and a 1st terminal of the sixth joint motor. A 13th terminal of the motor drive module U14 is connected to a 14th terminal of the motor drive module U14 and the product voltage VCCIN terminal. A 15th terminal of the motor drive module U14 is connected to a 32nd terminal of the chip U4, and a 16th terminal of the motor drive module U14 is connected to a 1st terminal of the chip U4. A 17th terminal of the motor drive module U14 is connected to a 98th terminal of the chip U4, and a 18th terminal of the motor drive module U14 is connected to one terminal of a capacitor C21. A 19th terminal of the motor drive module U14 is connected to a 20th terminal of the motor drive module U14, the other terminal of the capacitor C21 and the working voltage of 5.0. A 21st terminal of the motor drive module U14 is connected to a 97th terminal of the chip U4, and a 22nd terminal of the motor drive module U14 is connected to a 54th terminal of the chip U4. A 23rd terminal of the motor drive module U14 is connected to a 31st terminal of the chip U4, and a 24th terminal of the motor drive module U14 is connected to the working voltage VCCIN, one terminal of a capacitor E8 and one terminal of a capacitor C17. The other terminal of the capacitor E8 is connected to the other terminal of the capacitor C17 and then grounded.

A 1st terminal of a motor drive module U15 is connected to a 2nd terminal of the motor drive module U15 and a 1st terminal of a first scraper motor. A 3rd terminal of the motor drive module U15 is connected to a 4th terminal of the motor drive module U15 and a ground terminal, and a 5th terminal of the motor drive module U15 is connected to a 6th terminal of the motor drive module U15 and a 2nd terminal of the first scraper motor. A 7th terminal of the motor drive module U15 is connected to an 8th terminal of the motor drive module U15 and a 2nd terminal of a second scraper motor, and a 9th terminal of the motor drive module U15 is connected to a 10th terminal of the motor drive module U15 and the ground terminal. An 11th terminal of the motor drive module U15 is connected to a 12 terminal of the motor drive module U15 and a 1st terminal of a second scraper motor, and a 13 terminal of the motor drive module U15 is connected to a 14th terminal of the motor drive module U15 and the product voltage VCCIN terminal. A 15th terminal of the motor drive module U15 is connected to a 68th terminal of the chip U4, and a 16th terminal of the motor drive module U15 is connected to a 5th terminal of the chip U4. A 17th terminal of the motor drive module U15 is connected to a 4th terminal of the chip U4, and a 18th terminal of the motor drive module U15 is connected to one terminal of a capacitor C27. A 19th terminal of the motor drive module U15 is connected to a 20th terminal of the motor drive module U15, the other terminal of a capacitor C27 and the working voltage of 5.0. A 21th terminal of the motor drive module U15 is connected to a 3th terminal of the chip U4, and a 22th terminal of the motor drive module U15 is connected to a 2nd terminal of the chip U4. A 23rd terminal of the motor drive module U15 is connected to a 67th terminal of the chip U4, and a 24th terminal of the motor drive module U15 is connected to the working voltage VCCIN, one terminal of a capacitor E9 and one terminal of a capacitor C23. The other terminal of the capacitor E9 is connected to the other terminal of the capacitor C23 and then grounded.

A 1st terminal of the motor drive module U16 is connected to a 2nd terminal of the motor drive module U16 and a 1st terminal of a telescoping motor AS, and a 3rd terminal of the motor drive module U16 is connected to a 4th terminal of the motor drive module U16 and the ground terminal. A 5th terminal of the motor drive module U16 is connected to a 6th terminal of the motor drive module U16 and a 2nd terminal of the telescoping motor S. A 7th terminal of the motor drive module U16 is connected to an 8th terminal of the motor drive module U16 and a 2nd terminal of an electrode C1 of the auxiliary machine. A 9th terminal of the motor drive module U16 is connected to a 10th terminal of the motor drive module U16 and the ground terminal. An 11th terminal of the motor drive module U16 is connected to a 12th terminal of the motor drive module U16 and a 1st terminal of the electrode C1 of the auxiliary machine. A 13th terminal of the motor drive module U16 is connected to a 14th terminal of the motor drive module U16 and the product voltage VCCIN terminal. A 15th terminal of the motor drive module U16 is connected to a 70th terminal of the chip U4, and a 16th terminal of the motor drive module U16 is connected to a 41st terminal of the chip U4. A 17th terminal of the motor drive module U16 is connected to a 40th terminal of the chip U4.

A 18th terminal of the motor drive module U16 is connected to one terminal of a capacitor C28, and a 19th terminal of the motor drive module U16 is connected to the 20th terminal of the motor drive module U16, the other terminal of the capacitor C28 and the operating voltage 5.0. A 21st terminal of the motor drive module U16 is connected to a 39th terminal of the chip U4, and a 22nd terminal of the motor drive module U16 is connected to a 38th terminal of the chip U4. A 23rd terminal of the motor drive module U16 is connected to a 69th terminal of the chip U4, and a 24th terminal of the motor drive module U16 is connected to the working voltage VCCIN, one terminal of a capacitor E10 and one terminal of a capacitor C24. The other terminal of the capacitor E10 is connected to the other terminal of the capacitor C24 and then grounded.

Embodiment 5

In the floor mopping machine illustrated in Embodiment 1, a 85th terminal of the chip U4 is connected to a base b of a transistor Q11, and an emitter e of the transistor Q11 is grounded. A collector c of the transistor Q11 is connected to a 1st terminal of a relay JK2 and one terminal of a diode D3, and the other terminal of the diode D3 is connected to a 2nd terminal of the relay JK2 and the working voltage VCC5. A 5th terminal of the relay JK2 is grounded, and a 3rd terminal of the relay JK2 is connected to a 1st terminal of a power supply interface KixinK5 of the screen.

An 86th terminal of the chip U4 is connected to a base b of a transistor Q12, and an emitter e of the transistor Q12 is grounded. A collector c of the transistor Q12 is connected to a 1st terminal of a relay JK3 and one terminal of a diode D4, and the other terminal of the diode D4 is connected to a 2nd terminal of the relay JK3 and the working voltage VCC5. A 5th terminal of the relay JK3 is grounded, and a 3rd terminal of the relay JK3 is connected to a 1st terminal of an auxiliary motor.

An 82th terminal of the chip U4 is connected to a base b of a transistor Q16, and an emitter e of the transistor Q16 is grounded. A collector c of the transistor Q16 is connected to a 1st terminal of a relay JK5 and one terminal of a diode D6, and the other terminal of the diode D6 is connected to a 2nd terminal of the relay JK5 and the working voltage VCC5. A 5th terminal of the relay JK5 is grounded, and a 3rd terminal of the relay JK5 is connected to a 1st terminal of the power supply interface KixinK5 of the screen or projector. A 2nd terminal of the power supply interface KixinK5 of the screen or projector is connected to a 2nd terminal of the auxiliary motor.

Embodiment 6

In the floor mopping machine illustrated in Embodiment 1, a 1st terminal of a power interface J2 is connected to one terminal of a red LED LED3, one terminal of a resistor R21, one terminal of a capacitor C45, one terminal of a red LED LED4, one terminal of a resistor R22, a collector c of a transistor Q15, one terminal of a resistor R19, and one terminal of a battery B, one terminal of a capacitor E12, one terminal of a capacitor C43, a 3rd terminal and a 5th terminal of a switch-mode voltage regulator U17, one terminal of a diode VD2, one terminal of a capacitor E11, one terminal of a capacitor C44, a 1st terminal of the voltage regulator chip V2, one terminal of a capacitor C41, one terminal of a capacitor C42 and one terminal of the blue LED LED1.

The other terminal of the blue LED LED1 is connected to one terminal of a resistor R18, and the other terminal of the resistor R18 is connected to the working voltage VCC3.3, the other terminal of the capacitor C41, the other terminal of the capacitor C42, and the 2nd terminal of the voltage regulator chip V2.

A 3rd terminal of the voltage regulator chip V2 is connected to the other terminal of the capacitor E11, the other terminal of the capacitor C44, the working voltage VCC5, one terminal of the inductor L2, and a 4th terminal of the switch-mode voltage regulator U17.

A 3rd terminal of the voltage regulator chip V2 is connected to the other terminal of the capacitor E11, the other terminal of the capacitor C44, the working voltage VCC5, one terminal of an inductor L2, and a 4th terminal of the switch-mode voltage regulator U17.

The other terminal of the inductor L2 is connected to a 2nd terminal of the switch-mode voltage regulator U17 and the other terminal of the diode VD2.

A 1st terminal of the switch-mode voltage regulator U17 is connected to the other terminal of the capacitor E12, the other terminal of the capacitor C43, the other terminal of the battery B, one terminal of a resistor R20, one terminal of a varistor RP1, a working voltage VCC12 and a 2nd terminal of the power interface J2.

The other terminal of the resistor R20 is connected to the other terminal of the red LED LED3.

The other terminal of the varistor RP1 is connected to the other terminal of the resistor R21. A 3rd terminal of the resistor RP1 is connected to a base b of a transistor Q14, and an emitter e of the transistor Q14 is connected to the other terminal of the resistor R19.

A collector c of the transistor Q14 is connected to the other terminal of the capacitor C45, the other terminal of the red LED LED 4 and a base b of a transistor Q15.

An emitter e of the transistor Q15 is connected to the other terminal of the resistor R22.

Embodiment 7

In the floor mopping machine illustrated in Embodiment 5, a 78th terminal of the chip U4 is connected to a 1st terminal of an impact sensor I, and a 2nd terminal of the collision sensor I is grounded.

A 79th terminal of the chip U4 is connected to the 1st terminal of the collision sensor I, and the 2nd terminal of the collision sensor I is grounded.

The 79th terminal of the chip U4 is connected to a 1st terminal of a collision sensor II, and a 2nd terminal of the collision sensor II is grounded.

An 80th terminal of the chip U4 is connected to a 1st terminal of a collision sensor III, and a 2nd terminal of the collision sensor III is grounded.

A 7th terminal of the chip U4 is connected to a 1st terminal of a water tank sensor A, and a 2nd terminal of the water tank sensor A is grounded.

An 8th terminal of the chip U4 is connected to a 1st terminal of a water tank sensor B, and the 2nd terminal of the water tank sensor B is grounded.

An 80th terminal of the chip U4 is connected to a 2nd terminal of an infrared transceiver module, and a 55th terminal of the chip U4 is connected to a 1st terminal of the infrared transceiver module.

The working principles of the floor mopping machine are described as follows.

Both the main machine and the auxiliary machine of the floor mopping machine are turned on and initialized. The main machine of the floor mopping machine is released from the charging pile. The laser navigator on the main machine carries out the scanning to guide the main machine to mop the floor. Whether the main machine has to avoid obstacles is determined; if not, the laser navigator re-scans to carry out the guidance; if yes, the laser navigator will scan for modeling. The laser navigator stops when a space size smaller than the width of the mopping machine is scanned.

The third motor is started allow the telescopic rod to extend, and the corresponding joint motor is started to allow the extension arm to extend, so as to make the auxiliary machine of the mopping machine out of the casing. The auxiliary machine starts to mop the ground for 10 seconds. Then, the telescopic rod is retracted and the corresponding joint motor is started to retract the auxiliary machine of the mopping machine.

The main machine of the floor mopping machine is started again to mop the floor according to the scanning and the guidance of the laser navigator. When the mopping task is completed or the power is insufficient, the infrared transceiver on the charging pile sends a signal, and the infrared transceiver on the main machine of the floor mopping machine receives the signal to allow the main machine to reach the charging pile, and the charging pile receives the main machine.

The models of the first motor, the second motor, the fifth motor, the sixth motor, the third motor, the tenth motor and the eleventh motor are all DS36RP555. The models of the eighth motor and the fourth motor are ZWBPD024024-36. The model of the third motor is 38STG-100. The model of the joint motor is WL-37RS520. The model of the laser navigator is YDLIDAR X4. The model of the battery is 03EQ052-03. The model of the TV screen is SJD170 or Kixin K5. The model of the water pump is JT-1020. The model of the water level sensor of the water tank is DJL-Y25. The model of the scraper motor is 35BYJ412. The model of the cleaning liquid pump is JT-180B. The model of the auxiliary motor is DS36RP555.

The above description is illustrative of the present disclosure and is not intended to limit the scope of the present disclosure. Changes, modifications, additions or substitutions made by those skilled in the art within the scope of the present disclosure shall fall within the scope of the present invention.

What is claimed is:

1. A floor mopping machine, comprising:
a casing;
a main machine;
a joint motor;
a telescopic rod;
a battery;
a first motor;
a second motor;
a set of first pressure rollers;
a first rear cover;
a support plate; and
a brush;
wherein a screen is arranged on a top of the casing, and a laser navigator is arranged on a top of the screen; an inside of the casing is configured to accommodate an auxiliary machine; the auxiliary machine is connected to an extension arm through the joint motor, and the extension arm is connected to the telescopic rod through the joint motor; the telescopic rod is connected to a third motor which is arranged in front of the battery;
a partition plate is arranged at a middle of the casing, and the battery is arranged at a side of the partition plate; a first support roller is provided at an end of the battery away from the third motor, and a second support roller is provided at a side of the first support roller away from the battery; a set of second pressure rollers are arranged between the first support roller and the second support roller, and a set of third pressure rollers are arranged between the first support roller and a first driving roller; the first motor is capable of driving the first driving roller to rotate around an axis of the first driving roller;
a mounting frame is provided at a side of the partition plate away from the battery and is configured to place the auxiliary machine; a second driving roller is provided at a side of the set of the first pressure rollers away from the mounting frame, and a third support roller is provided at a side of the set of the first pressure rollers away from the second driving roller; a fourth support roller is provided at a side of the third support roller away from the mounting frame; a set of fourth pressure rollers are arranged between the third support roller and the fourth support roller; the second motor is capable of driving the second driving roller to rotate around an axis of the second driving roller;
the battery is configured to transmit voltages to the first motor and the second motor, respectively;
the first rear cover is provided with a recess, and the second support roller and the fourth support roller are arranged in the recess of the first rear cover; a top of the first rear cover is mounted in a body of the laser navigator; the body of the laser navigator is placed on a support plate, and a water tank is provided at an end of the support plate away from the laser navigator; a water inlet is provided at a front end of the water tank, and a water spray port is provided below the water inlet; a fluid is delivered to the water spray port through a water pump or a cleaning liquid pump, and the fluid from the water spray port flows to the brush; a first cleaning member is provided at a side of the brush away from the water inlet;
a driven wheel is provided at a bottom of the first rear cover, and a first trash collection container is provided at a side of the first cleaning member close to the driven wheel; and the first trash collection container and the water tank are both arranged in the first rear cover; and
a scraper plate is provided between the water inlet and the water spray port, and both ends of the scraper plate are respectively connected to a first driven gear; a fourth motor is connected to a first driving gear, and the first driving gear meshes with the first driven gear; the fourth motor is configured to drive the first driving gear to rotate around an axis of the first driving gear, so as to drive the first driven gear to rotate around an axis of the first driven gear.

2. The floor mopping machine of claim 1, wherein a fixing plate is provided at an end of the partition plate away from the laser navigator and is connected to a motor plate; a fifth motor is arranged at a center of the motor plate and is connected to a second driving gear; the fifth motor is configured to drive the second driving gear to rotate around an axis of the second driving gear; the second driving gear meshes with a second driven gear and a third driven gear, respectively; the second driven gear meshes with a fourth driven gear, and the fourth driven gear meshes with a fifth driven gear; the fifth driven gear meshes with a sixth driven gear, and the sixth driven gear meshes with a seventh driven gear;

the third driven gear meshes with an eighth driven gear, and the eighth driven gear meshes with a ninth driven gear; the ninth driven gear meshes with a tenth driven gear, and the tenth driven gear meshes with an eleventh driven gear; and the second driven gear, the fifth driven gear, the seventh driven gear, the third driven gear, the ninth driven gear and the eleventh driven gear are respectively connected to vertical brushes, and a second cleaning member is provided at each side of each of the vertical brushes.

3. The floor mopping machine of claim 2, further comprising:
a first pipe;
a second pipe;
a sixth motor; and
a first dust suction member;
wherein a dust suction box is provided at a side of the partition plate away from the battery; one end of the first pipe is connected to the dust suction box, and the other end of the first pipe is connected to the first dust suction member; a first filter screen is provided at one end of the dust suction box away from the first dust suction member, and is connected to a motor box through the second pipe; the sixth motor is provided in the motor box; the sixth motor is connected to a fan, and a side of the motor box is provided with a first air outlet; the motor box and the dust suction box are placed on the set of first pressure rollers and the third support roller.

4. The floor mopping machine of claim 2, wherein the auxiliary machine and a side of the main machine provided with the battery have the same structure; the auxiliary machine comprises a second rear cover, and the main machine comprises the first rear cover; the second rear cover of the auxiliary machine and the first rear cover of the main machine are the same in structure.

5. The floor mopping machine of claim 1, wherein a T-shaped dust suction pipe is provided on a top surface of the casing; one end of the T-shaped dust suction pipe is provided with a second dust suction member, and the other end of the T-shaped dust suction pipe is connected to a second trash collection container; a second filter screen is provided at one end of the second trash collection container, and a seventh motor is provided at an end of the second filter screen away from the second trash collection container; a second air outlet is provided at an end of the seventh motor away from the second filter screen.

6. The floor mopping machine of claim 5, further comprising:
a charging pile;
a first guide shaft;
a first vertical support plate;
two horizontal connecting plates;
a first fixing shaft;
a second fixing shaft;
an eighth motor;
a second vertical support plate; and
an infrared receiver;
wherein the charging pile comprises a first charging arm shell and a second charging arm shell, and the first charging arm shell and the second charging arm shell are connected by the two horizontal connecting plates, respectively; the eighth motor is mounted inside the first charging arm shell, and the eighth motor is movable on the first guide shaft; an end of the eighth motor away from the first guide shaft is connected to a first support arm, and the first support arm is connected to a second support arm through the first fixing shaft; an end of the second support arm away from the first fixing shaft is connected to a ninth motor, and the ninth motor is connected to a first charging terminal; the first support arm is clamped on the first vertical support plate, and the first vertical support plate is hinged to a first foldable support plate;
a tenth motor is mounted inside the second charging arm shell and is movable on a second guide shaft; a third support arm is connected to an end of the tenth motor away from the second guide shaft, and the third support arm is connected to a fourth support arm through the second fixing shaft; an end of the fourth support arm away from the second fixing shaft is connected to an eleventh motor, and the eleventh motor is connected to a second charging terminal; the first charging terminal and the second charging terminal are both electrically connected to the battery; the third support arm is clamped on the second vertical support plate, and the second vertical support plate is hinged to a second foldable support plate; and
an infrared transmitter is mounted at a side of the two horizontal connecting plates and is configured to send an infrared signal to the infrared receiver; and the infrared receiver is arranged on the casing of the main machine.

* * * * *